US012654096B2

(12) United States Patent
Flores et al.

(10) Patent No.: US 12,654,096 B2
(45) Date of Patent: Jun. 16, 2026

(54) ARTIFICIAL INTELLIGENCE (AI) PLAYER MODELING AND TRAINING

(71) Applicant: Sony Interactive Entertainment Inc., Tokyo (JP)

(72) Inventors: Erick Flores, San Mateo, CA (US); Steven Osman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 281 days.

(21) Appl. No.: 18/493,180

(22) Filed: Oct. 24, 2023

(65) Prior Publication Data

US 2024/0165509 A1 May 23, 2024

Related U.S. Application Data

(60) Provisional application No. 63/426,896, filed on Nov. 21, 2022.

(51) Int. Cl.
*A63F 13/42* (2014.01)
*A63F 13/40* (2014.01)
*G06N 20/00* (2019.01)

(52) U.S. Cl.
CPC ............. *A63F 13/40* (2014.09); *G06N 20/00* (2019.01)

(58) Field of Classification Search
None
See application file for complete search history.

(56) References Cited

U.S. PATENT DOCUMENTS

| | | | | |
|---|---|---|---|---|
| 11,544,594 B2 * | 1/2023 | Woo | | G06N 5/04 |
| 11,654,363 B1 | 5/2023 | Rainbolt et al. | | |
| 2017/0157512 A1 | 6/2017 | Long et al. | | |
| 2017/0266569 A1 | 9/2017 | Sullivan et al. | | |
| 2021/0008456 A1 * | 1/2021 | Somers | | A63F 13/69 |
| 2021/0093968 A1 | 4/2021 | McCoy et al. | | |
| 2021/0142571 A1 | 5/2021 | Shahraray et al. | | |
| 2021/0236925 A1 | 8/2021 | Hammons et al. | | |

(Continued)

OTHER PUBLICATIONS

PCT Application No. PCT/US2023/035816, International Search Report and Written Opinion of the International Searching Authority, Mailed on Mar. 6, 2024, 15 pages.

(Continued)

*Primary Examiner* — Sunit Pandya
(74) *Attorney, Agent, or Firm* — Fish & Richardson P.C.

(57) ABSTRACT

An artificial intelligence (AI) model generates a control input for a virtual player of a video game based on input state data. A video stream of the video game is generated based on the control input for the virtual player of the video game. The video stream is transmitted to a client device. Training feedback data is received from the client device and includes a time-dependent series of human-generated feedback elements correlated to the video stream. Each feedback element indicates that the control input for the virtual player of the video game, as generated by the AI model, is either a player-approved control input or a player-disapproved control input. AI model training includes reinforcing use of the player-approved control input for the virtual player in response to the input state data, and diminishing use of the player-disapproved control input for the virtual player in response to the input state data.

20 Claims, 8 Drawing Sheets

(56) References Cited

U.S. PATENT DOCUMENTS

| | | | |
|---|---|---|---|
| 2021/0344991 A1 | 11/2021 | Todd | |
| 2025/0041717 A1* | 2/2025 | Munjeti | .................. A63F 13/67 |
| 2025/0147770 A1 | 5/2025 | Osman et al. | |

OTHER PUBLICATIONS

Agarwal, Mohit et al., "Human-In-The-Loop RL with an EEG Wearable Headset: On Effective Use of Brainwaves to Accelerate Learning," Proceedings of the 6th ACM Workshop on Wearable Systems and Applications, ACMPUB27, New York, New York, US, Jun. 19, 2020, 6 pages.
Little French Robot, "A.I learns to play a game with an Xbox controller," Retrieved on Feb. 13, 2024, from the Internet: URL: https://www.youtube.com/watch?v=zJdZ-RQOFks, Online Publication Date: Apr. 18, 2020, 2 pages.
Sridharan, Mohan, "Augmented Reinforcement Learning for Interaction with Non-expert Humans in Agent Domains," 2011 10th International Conference on Machine Learning and Applications and Workshops (ICMLA), Dec. 18, 2011, 6 pages.
Cruz, Christian Arzate et al., "MarioMix: Creating Aligned Playstyles for Bots with Interactive Reinforcement Learning," Proceedings of the 2020 ACM SIGSIM Conference on Principles of Advanced Discrete Simulation, ACMPUB27, New York, New York, US, Nov. 2, 2020, 6 pages.

* cited by examiner

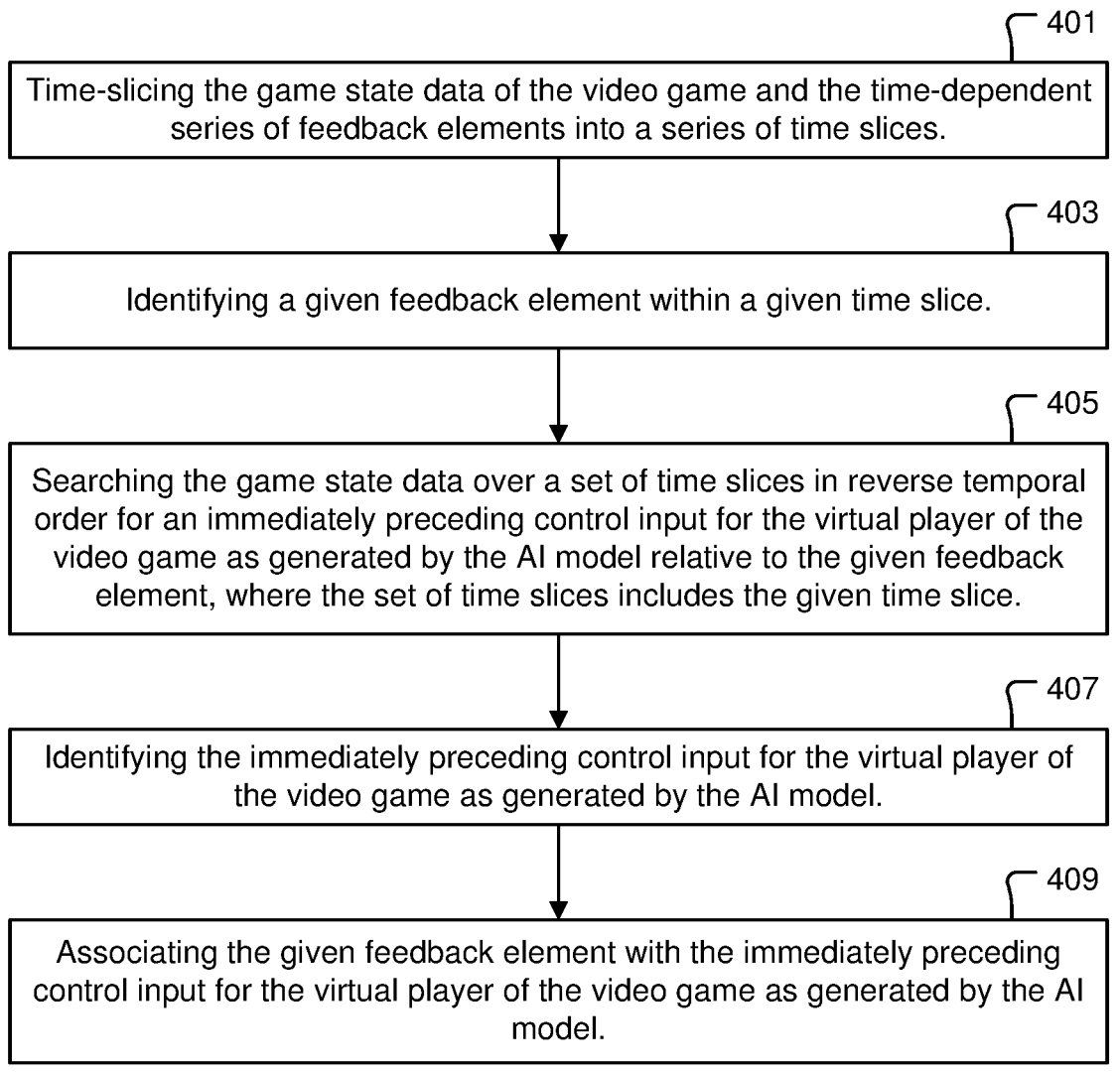

401

Time-slicing the game state data of the video game and the time-dependent series of feedback elements into a series of time slices.

403

Identifying a given feedback element within a given time slice.

405

Searching the game state data over a set of time slices in reverse temporal order for an immediately preceding control input for the virtual player of the video game as generated by the AI model relative to the given feedback element, where the set of time slices includes the given time slice.

407

Identifying the immediately preceding control input for the virtual player of the video game as generated by the AI model.

409

Associating the given feedback element with the immediately preceding control input for the virtual player of the video game as generated by the AI model.

Fig. 4A

| Time-Dependent Training Feedback Correlations for Game State Instance 34097 | | AI Model Training |
|---|---|---|
| Feedback Element | AI Generated Control Input | |
| FB1 (Approval) | AI Control Input 1 | Reinforce Use |
| FB2 (Disapproval) | AI Control Input 2 | Diminish Use |

ARTIFICIAL INTELLIGENCE (AI) PLAYER MODELING AND TRAINING

CLAIM OF PRIORITY

This application claims priority under 35 U.S.C. 119(e) to U.S. Provisional Patent Application No. 63/426,896, filed Nov. 21, 2022, the disclosure of which is incorporated herein by reference in its entirety for all purposes.

BACKGROUND

The video game industry has seen many changes over the years and has been trying to find ways to enhance the video game play experience for players and increase player engagement with the video games and/or online gaming systems. When a player increases their engagement with a video game, the player is more likely to continue playing the video game and/or play the video game more frequently, which ultimately leads to increased revenue for the video game developers and providers and video game industry in general. Therefore, video game developers and providers continue to seek improvements in video game operations to provide for increased player engagement and enhanced player experience. It is within this context that implementations of the present disclosure arise.

SUMMARY

In an example embodiment, a method is disclosed for training an artificial intelligence (AI) model for play of a video game. The method includes receiving game state data of the video game as input state data for the AI model. The method also includes using the AI model to generate a control input for a virtual player of the video game based on the input state data. The method also includes generating a video stream of play of the video game by executing game logic of the video game in accordance with both the control input for the virtual player of the video game as generated by the AI model and the game state data of the video game. The method also includes transmitting the video stream of play of the video game to a client device of a human player of the video game. The method also includes receiving training feedback data from the client device of the human player of the video game. The training feedback data includes a time-dependent series of feedback elements correlated to the video stream of play of the video game. Each feedback element indicates that the control input for the virtual player of the video game as generated by the AI model is either a player-approved control input or a player-disapproved control input. The method also includes training the AI model by reinforcing use of the player-approved control input for the virtual player in response to the input state data. The method also includes training the AI model by diminishing use of the player-disapproved control input for the virtual player in response to the input state data.

In an example embodiment, a computer system is disclosed as including a processor and a memory coupled to the processor. The memory has stored therein program instructions that when executed by the computer system cause the computer system to execute a method for training an AI model for play of a video game. The program instructions of the method direct the receiving of game state data of the video game as input state data for the AI model. The program instructions of the method direct use of the AI model to generate a control input for a virtual player of the video game based on the input state data. The program instructions of the method direct generation of a video stream of play of the video game by executing game logic of the video game in accordance with both the control input for the virtual player of the video game as generated by the AI model and the game state data of the video game. The program instructions of the method direct transmission of the video stream of play of the video game to a client device of a human player of the video game. The program instructions of the method direct the receiving of training feedback data from the client device of the human player of the video game. The training feedback data includes a time-dependent series of feedback elements correlated to the video stream of play of the video game. Each feedback element indicates that the control input for the virtual player of the video game as generated by the AI model is either a player-approved control input or a player-disapproved control input. The program instructions of the method direct training of the AI model by reinforcing use of the player-approved control input for the virtual player in response to the input state data. The program instructions of the method also direct training of the AI model by diminishing use of the player-disapproved control input for the virtual player in response to the input state data.

BRIEF DESCRIPTION OF THE DRAWINGS

FIG. 4A shows a flowchart of a method for correlating the time-dependent series of feedback elements to the play of the video game, in accordance with some embodiments.

DETAILED DESCRIPTION

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Figure 1:
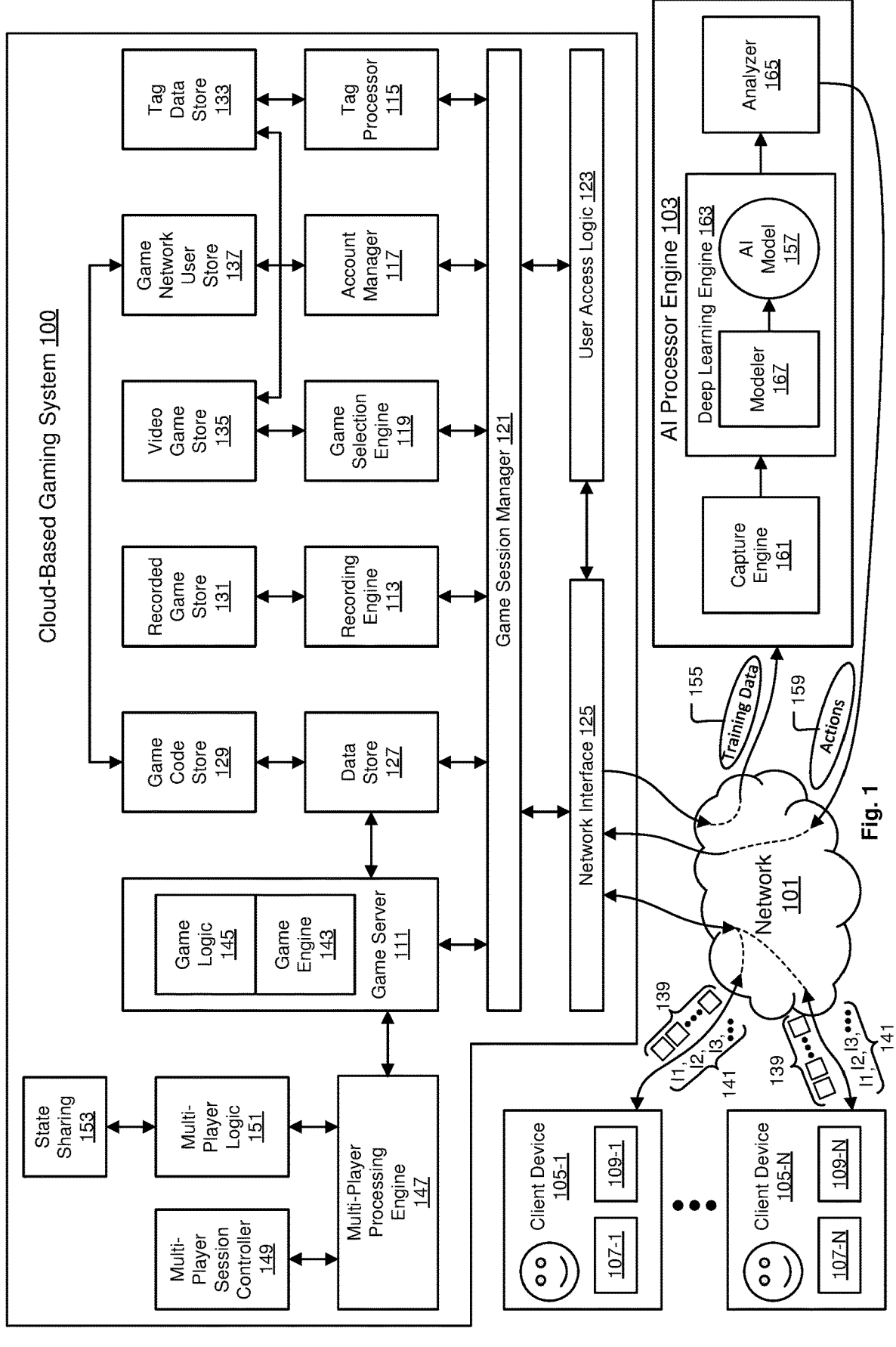
FIG. 1 shows a cloud-based gaming system, in accordance with some embodiments.

FIG. 1 shows a cloud-based gaming system 100, in accordance with some embodiments. The cloud-based gaming system 100 is configured to support the collection of training data used to build and/or train an artificial intelligence (AI) model relating to a gaming application and/or game plays of the gaming application. The cloud-based gaming system 100 provides for access to and playing of online video games. The cloud-based gaming system 100 engages in bi-directional data communication over a network 101, e.g., Internet, to support any number of players in playing an online of video game. In some embodiments, data related to video game play on the cloud-based gaming system 100 is provided to an AI processor engine 103 as AI development data for use in building an AI model 157 of a game player and in training the AI model 157 of the game player. In some embodiments, both the cloud-based gaming system 100 and the AI processor engine 103 are implemented within a cloud computing infrastructure and are in bi-directional data communication with each other over the network 101. The cloud-based gaming system 100 is also in bi-directional data communication over the network 101 with each of a number (N) of client devices 105-1 to 105-N. Each of the client devices 105-1 to 105-N is configured to access and use services provided by the cloud-based gaming system 100.

Each client device 105-1 to 105-N can include any type of device having a processor and memory. Each client device 105-1 to 105-N can be either wired or wireless. Also, each client device 105-1 to 105-N can be either portable or not portable. In some embodiments, a given client device 105-1 to 105-N can be in the form of a smartphone, a tablet computer, or hybrids that provide touch screen capability in a portable form factor. In some embodiments, a given client device 105-1 to 105-N includes a local portable device, e.g., smartphone, tablet, laptop, desktop, etc., that runs an operating system and that is provided with access to various applications (apps) that may be obtained over the network 101 and executed on the local portable device. Each client device 105-1 to 105-N includes a display device 107-1 to 107-N, respectively, that provides an interface through which visual content is conveyed to a player from the cloud-based gaming system 100, where the visual content corresponds to data and/or information received from the cloud-based gaming system 100. In various embodiments, the display device 107-1 to 107-N can be configured as a touch-screen, a flat-panel display, a cathode ray tube (CRT), or essentially any other type of device capable of rendering a display based on computer-generated data. In some embodiments, the display device 107-1 to 107-N is a head-mounted display (HMD).

Additionally, each client device 105-1 to 105-N is equipped with some type of input device 109-1 to 109-N, respectively. In some embodiments, the input device 109-1 to 109-N is a touch screen that also serves as the display device 107-1 to 107-N. In some embodiments, the input device 109-1 to 109-N is a game controller, a keyboard, a mouse, a joystick, an HMD, or essentially any other type of input device that is configured to provide signals to the client device 105-1 to 105-N in response to player actions. In some embodiments, the input device 109-1 to 109-N includes a video capture system, e.g., one or more video cameras, that are configured to capture images of a player which convey gestures that can be interpreted by the client device 105-1 to 105-N and/or cloud-based gaming system 100 as player inputs. Also, in some embodiments, the input device 109-1 to 109-N includes an audio capture system, e.g., one or more microphones, that are configured to capture sounds spoken by a player which can be interpreted by the client device 105-1 to 105-N and/or cloud-based gaming system 100 as player inputs. It should be understood that each client device 105-1 to 105-N is configured to interact with an instance of a gaming application executed by the cloud-based gaming system 100 to implement game play of a player who is operating the corresponding one of the client devices 105-1 to 105-N, such as through input commands that are used to drive game play.

In some embodiments, the cloud-based gaming system 100 includes a game server 111, a recording engine 113, a tag processor 115, an account manager 117 that includes a user profile manager, a game selection engine 119, a game session manager 121, user access logic 123, and a network interface 125. Also, in some embodiments, the cloud-based gaming system 100 further includes a plurality of gaming-related digital data storage systems, such as a game state store, a random seed store, a user saved data store, a snapshot store, etc., which may be stored generally in data store 127. Also, in some embodiments, the cloud-based gaming system 100 further includes a game code store 129, a recorded game store 131, a tag data store 133, a video game data store 135, and a game network user store 137, each of which is configured to store digital data.

In various embodiments, the cloud-based gaming system 100 provides gaming applications, services, gaming related digital content, and interconnectivity among systems, applications, users, and social networks. For example, a player at a given one of the client devices 105-1 to 105-N is able to access services provided by the cloud-based gaming system 100 by way of the game session manager 121. The account manager 117 enables authentication and access by the player to the cloud-based gaming system 100. The account manager 117 stores information about member users/players. For example, a user profile for each member user may be managed by the account manager 117. Information about the member user is used by the account manager 117 for authentication purposes. The account manager 117 operates to update and manage user information related to a member user. Additionally, game titles owned by a member user may be managed by account manager 117. In some embodiments, video games stored in video game data store 135 are made available to any member user who owns those video games.

In some embodiments, a given client device 105-x (any one of client devices 105-1 to 105-N) is configured to communicate with the cloud-based gaming system 100 to enable a player to play a video game through the given client device 105-x. For example, the player may select (e.g., by game title, etc.) a video game that is available in the video game data store 135 via the game selection engine 119. The selected video game is enabled and loaded for execution by game server 111. In some embodiments, game play is primarily executed in the cloud-based gaming system 100, such that the given client device 105-x will receive a stream of game video frames 139 from the cloud-based gaming system 100 based on user input commands 141 transmitted from the given client device 105-x to the cloud-based gaming system 100 for driving the game play. The received stream of game video frames 139 are decoded and displayed through a display device 107-x of the given client device 105-x.

In some embodiments, after the player chooses an available game title to play, a game session for the chosen game title is initiated by the player through game session manager 121. The game session manager 121 first accesses game state store in data store 127 to retrieve the saved game state of the last session played by the player for the selected game, if any, so that the player can restart game play from a previous game play stop point. Once the resume or start point is identified, the game session manager 121 directs the game server 111 to execute the game code of the chosen game title from game code store 129. After the game session is initiated, the game session manager 121 conveys the game video frames 139 (streaming video data), via the network interface 125 to the given client device 105-*x*.

During game play, the game session manager 121 communicates with game server 111, recording engine 113, and tag processor 115 to generate or save a recording, e.g., video, of the game play or game play session. In some embodiments, the video recording of the game play can include tag content entered or provided during game play, and other game related metadata. Tag content can also be saved via snapshots. The video recording of game play, along with any game metrics corresponding to that game play, are saved in recorded game store 131. Tag content is saved in tag data store 133.

Also, during game play of a video game, the game session manager 121 communicates with the game server 111 to deliver user/player input commands 141 that are used to drive game play of the video game. The input commands 141 entered by the player of the given client device 105-*x* are transmitted from the given client device 105-*x* over the network 101 to the game session manager 121. The input commands 141 can include any type of input command used to drive game play, and may include user interactive input, such as tag content, e.g., texts, images, video recording clips, etc. Game input commands 141 as well as any user play metrics, such as how long the user plays the game, etc., are stored in game network user store 137.

In various embodiments, the game server 111 can be any type of server computing device available in the cloud. In some embodiments, the game server 111 is configured as one or more virtual machines (VMs) executing on one or more hosts. For example, in some embodiments, the game server 111 manages a VM supporting a game processor that instantiates an instance of a gaming application for a user. In some embodiments, a plurality of game processors of game server 111 associated with a plurality of VMs is configured to execute multiple instances of the gaming application associated with game plays of a plurality of players respectively operating the plurality of client devices 105-1 to 105-N. In some embodiments, back-end server support provides streaming of media, e.g., video, audio, etc., of game plays of a plurality of gaming applications to the client devices 105-1 to 105-N of a plurality of corresponding users.

In some embodiments, the game server 111 includes a game engine 143 configured to execute game logic 145. In some embodiments, an instance of a gaming application is executed by the game engine 143 that runs game logic 145 corresponding to the gaming application. The game logic 145, e.g., executable code, that implements the gaming application is stored and accessible through one or more of the data store 127, the game code store 129, and the video game store 135. In some embodiments, the game engine 143 is configured to support simultaneous execution of a plurality of gaming applications using a corresponding plurality of game logics 145. The various functions performed by a game engine 143 include basic processor based functions for executing the gaming application and services associated with the gaming application. For example, processor based functions performed by the game engine 143 include two-dimensional or three-dimensional rendering, physics, physics simulation, scripting, audio, animation, graphics processing, lighting, shading, rasterization, ray tracing, shadowing, culling, transformation, artificial intelligence, etc. Also, services for the gaming application as provided by the game server 111 and/or game engine 143 and/or multi-player processing engine 147 include streaming, encoding, memory management, multi-thread management, quality of service (QOS), bandwidth testing, social networking, management of social friends, communication with social networks of friends, communication channels, texting, instant messaging, chat support, etc.

In some embodiments, the game server 111 of the cloud-based gaming system 100 includes a plurality of VMs running on a hypervisor of a host machine, with one or more VMs configured to implement the game engine 143 utilizing the hardware resources available to the hypervisor of the host. In other embodiments, the game server 111 of the cloud-based gaming system 100 implements a distributed configuration of the game engine 143 that executes the game logic 145 as a corresponding instance of the gaming application. In general, the distributed configuration of the game engine 143 takes each of the functions of the game engine 143 and distributes those functions for execution by a multitude of processing entities across one or more servers of the cloud-based gaming system 100. In some embodiments, individual functions can be further distributed across one or more processing entities of the cloud-based gaming system 100. The various processing entities may be configured differently from one another, including as metal or physical hardware, and/or as virtual components or VMs, and/or as virtual containers, where a virtual container is different from a VM in that the virtual container virtualizes an instance of the gaming application running on a virtualized operating system. The processing entities may utilize and/or rely on servers and their underlying hardware on one or more servers (compute nodes) of the cloud-based gaming system 100, where the servers may be located on one or more racks. In some embodiments, the coordination, assignment, and management of the execution of the functions to the various processing entities are performed by a distribution synchronization layer. In this manner, execution of the functions of the game engine 143 is controlled by the distribution synchronization layer to enable generation of media (e.g., video frames, audio, etc.) for the gaming application in response to the inputs 141 received from the player. The distribution synchronization layer is able to efficiently execute (e.g., through load balancing) the functions of the game engine 143 across the distributed processing entities, such that critical game engine 143 components/functions are distributed and reassembled for more efficient processing.

Additionally, the distribution synchronization layer can be scaled to handle increased processing demand or complexity of processing by adding more processing entities. For example, the processing power can be elastically increased or decreased based on demand. Also, the distributed game engine system can be scaled across many users, each of which is supported by a corresponding distributed game engine 143, such as in a multi-player gaming session for the gaming application. As such, the multi-player gaming session is not constrained by hardware limitations that limit the maximum number of players in the session because of performance issues (e.g., latency). Instead, the scalable distributed gaming engine system is able to scale up or down the number of distributed gaming engines depending on the number of players participating in the multi-player gaming session without any hardware constraints. As such, many thousands of players may participate in a single multi-player gaming session.

In some embodiments, a multi-player processing engine 147 is in bidirectional data communication with the game server 111. The multi-player processing engine 147 provides for controlling a multi-player gaming session for a gaming application. In particular, when the multi-player processing engine 147 is managing the multi-player gaming session, a multi-player session controller 149 is configured to establish and maintain communication sessions with each of the users and/or players in the multi-player session. In this manner, players in the multi-player session can communicate with each other as controlled by the multi-player session controller 149. The multi-player processing engine 147 also communicates with multi-player logic 151 in order to enable interaction between players within corresponding gaming environments of each player. In particular, a state sharing module 153 is configured to manage states for each of the players in the multi-player gaming session. In some embodiments, game state data defines the state of game play of a particular player of a gaming application at a particular point in time. In some embodiments, game state data includes user/player saved data that includes information that personalizes the video game for the corresponding player. For example, game state data can include information associated with the user's character, so that the video game is rendered with a character that may be unique to that user, such as with regard to shape, look, clothing, weaponry, etc. In some embodiments, the multi-player processing engine 147 is configured to use the state sharing data 153 and multi-player logic 151 to overlay/insert objects and/or characters into each of the gaming environments of the users participating in the multi-player gaming session, which allows for interaction between different users in the multi-player gaming session via each of their respective gaming environments as displayed on their respective client devices 105-1 to 105-N.

In some embodiments, the cloud-based gaming system 100 provides for collection of training data 155 used to build and/or train the AI model 157 related to a gaming application and/or to game plays of a gaming application executed by the cloud-based gaming system 100. More specifically, in some embodiments, the cloud-based gaming system 100 communicates training data 155 to the AI processor engine 103. The AI processor engine 103 is configured to use the training data 155 received from the cloud-based gaming system 100 to develop and train the AI model 157. Once develop and trained, the AI model 157 is usable to provide various actions 159 related to the gaming application and/or to game plays of the gaming application as executed by the cloud-based gaming system 100, such as by providing recommendations to players, by training players, by discovering weaknesses of players, by providing bot opponents, by providing stand-in bot players for auto-play purposes, among other actions. In some embodiments, the AI processor engine 103 is implemented separate from the cloud-based gaming system 100 to provide back-end server support. In some of these embodiments, the AI processor engine 103 is in bidirectional data communication with the cloud-based gaming system 100 over the network 101. In some embodiments, the AI processor engine 103 is implemented within the cloud-based gaming system 100, such that the AI processor engine 103 is in direct bidirectional data communication with the game session manager 121 without having to convey data over the network 101, which reduces latency. In some embodiments, the AI processor engine 103 includes a capture engine 161, a deep learning engine 163, and an analyzer 165. The capture engine 161 is configured to capture game play data and other data that may be provided to the AI processor engine 103 in the training data 155. The deep learning engine 163 is configured for learning and/or modeling, in part, the responses and/or actions (e.g., controller inputs, etc.) to be performed for any given set of inputs (e.g., that define a condition of a game play of a gaming application, including game state, etc.) in order to build (through a modeler 167) and apply (through the analyzer 165) the trained AI model 157 in relation to a gaming application and/or subsequent game play of the gaming application. In some embodiments, the modeler 167 within the deep learning engine 163 operates to set the parameters defined within the deep learning engine 163 that define various nodes within the AI model 157. Also, in some embodiments, the modeler 167 is configured to set some parameters in the AI model 157 based on one or more success criteria used during training.

In some embodiments, the AI model 157 is trained to learn the intricacies of the gaming application and/or the intricacies of playing the gaming application so that the AI model 157 can be used to provide various actions in relation to the gaming application and/or a game play of the gaming application, such as predicting and/or determining what actions, e.g., controller inputs, to take in response to a given condition of game play, e.g., a given game state. In some embodiments, the analyzer 165 is configured to analyze the output from the AI model 157 responding to input(s) that define a given condition of game play, e.g., a given game state, in order to provide an appropriate response to the given condition of game play, wherein the appropriate response may be dependent on a predefined objective, such as to provide assistance to a player, to provide coaching for a player, to provide a bot to compete against a player, to provide a bot to automatically play for a player, among others.

Figure 2A:
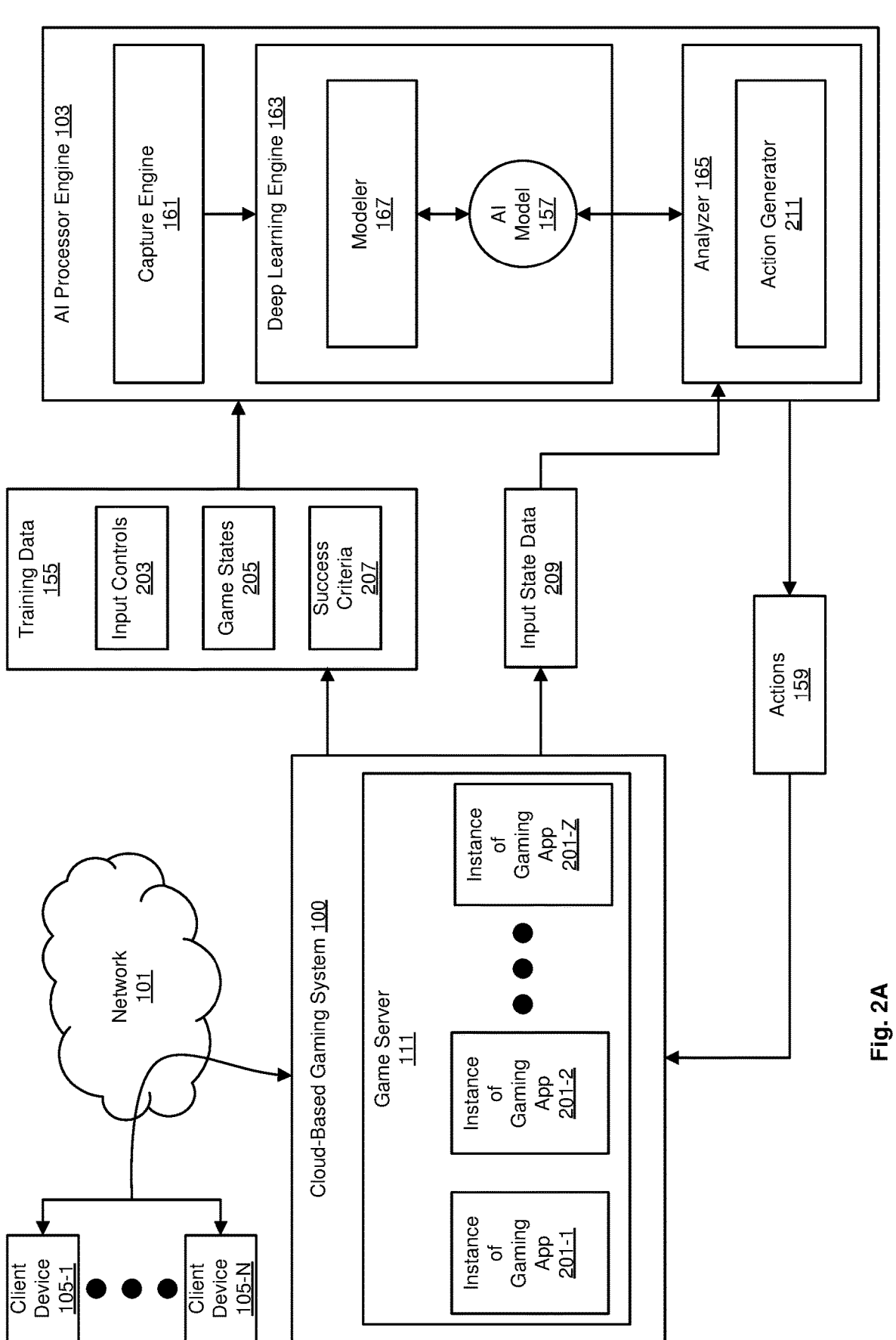
FIG. 2A shows a more detailed diagram of the cloud-based gaming system in data communication with the AI processor engine, in accordance with some embodiments.

FIG. 2A shows a more detailed diagram of the cloud-based gaming system 100 in data communication with the AI processor engine 103, in accordance with some embodiments. In the example of FIG. 2A, the AI processor engine 103 is in direct bidirectional data communication with the cloud-based gaming server 100. However, it should be understood that in other embodiments the AI processor engine 103 can be implemented to have bidirectional data communication with the cloud-based gaming server 100 through the network 101. Generally speaking, the various embodiments of the present disclosure describe systems and methods implementing deep learning (also referred to as machine learning) techniques to build the AI model 157 that is related to a gaming application, and/or game plays of the gaming application. In particular, the AI model 157 is configured to provide various functionalities in relation to a gaming application and/or to game play of the gaming application, including predicting and/or determining what actions to take in response to a given condition (e.g., game state) of the gaming application. The AI model 157 is trained and/or built using a network of servers (e.g., through the cloud-based gaming system 100) executing one or more instances 201-1 to 201-Z of the gaming application supporting multiple game plays, where Z is greater than or equal to one. In various embodiments, the AI model 157 is trained based on training data 155 that includes input control data 203, game state data 205 occurring during numerous game plays, and success criteria 207. The input control data 203 is a record of input signals, e.g., game controller inputs, received from player(s) for directing game play in response to each of numerous game states 205. In some embodiments, the AI model 157 is trained based on the success criteria 207, such as following one path over another similar path through the AI model 157 that is more successful in terms of the success criteria 207. In this manner, the AI model 157 learns to take the more successful path.

The training data 155 may include metadata associated with multiple game plays of a particular gaming application, such as controller inputs 203, game states 205, progress through the game play, results (e.g., success or failure) of the scenario, user profile information, success criteria 207, etc. That is, the training data 155 includes any data that may be relevant to understanding the gaming application and/or game plays of the gaming application. Because the instances of the gaming application are executing on the cloud-based gaming system 100, access to the training data 155 is readily available without disrupting and/or tasking the associated players of those game plays. In some embodiments, the players may not know that the training data 155 is being collected.

The training data 155 may include game state data 205 that defines the state and/or condition of a gaming application at a particular point during a game play, i.e., at a snapshot of the game play. For example, game state data 205 may include game characters, game objects, game object attributes, game attributes, game object state, graphic overlays, etc. In that manner, game state data 205 allows for the generation of the gaming environment that existed at the corresponding point in the video game. Game state data 205 may also include the state of every device used for rendering the game play, such as states of CPU, GPU, memory, register values, program counter value, programmable DMA state, buffered data for the DMA, audio chip state, CD-ROM state, etc. Game state data 205 may also identify which parts of the executable code need to be loaded to execute the video game from that point. Not all the game state data 205 needs to be captured and stored, just the game state data 205 that is sufficient for the executable code to start the game at the point corresponding to the snapshot.

Also, the training data 155 may include user saved data that personalizes the gaming application for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the snapshot. For example, user saved data may include the game difficulty selected by the corresponding player when playing the gaming application, game level, character attributes, character location, number of lives left, the total possible number of lives available, armor, trophy, time counter values, etc. User saved data may also include user profile data that identifies the corresponding player.

Also, training data 155 may include random seed data that is generated through AI. The random seed data may not be part of the original game code, but may be added in an overlay to make the gaming environment seem more realistic and/or engaging to the user. That is, random seed data provides additional features for the gaming environment that exists at the corresponding point in the game play of the player. For example, AI characters may be randomly generated and provided in the overlay. The AI characters are placed into the gaming environment to enhance the user's experience, and may or may not affect the game play. As an illustration, these AI characters may randomly walk the streets in a city scene. In addition, other objects may be generated and presented in an overlay. For instance, clouds in the background and birds flying through space may be generated and presented in an overlay.

The AI model 157 is continually refined through the continued collection of training data 155, and by comparing new training data 155 to existing training data 155 to facilitate use of the best training data 155 based on the success criteria 207. In some embodiments, the AI model 157 is trained to learn the intricacies of the gaming application, and/or intricacies of playing the gaming application (e.g., through a corresponding game play). Once the AI model 157 is trained, the analyzer 165 can use the AI model 157 to determine an appropriate response to a given input condition, where the given input condition represents a condition of a game play of a gaming application (e.g., the game state of a particular game play). In some embodiments, the response to the given input condition as determined by the AI model 157 is dependent on a predefined objective, such as providing assistance to a game player, simulating the game play of a game player, among essentially any other predefined objective. In some embodiments, the analyzer 165 uses the trained AI model 157 to determine how the gaming application should respond, or how the player should respond during a corresponding game play.

The deep learning engine 163 includes the modeler 167 that is configured to build and/or train the AI model 157 using the training data 155. The AI model 157 may be implemented during subsequent game play (e.g., after training of the AI model 157) of the gaming application (e.g., by a player, by an automatic player, etc.). In some embodiments, the AI model 157 may be implemented and/or executed at a back-end server in support of the game play, where the game play may be executing on a local device (to the player) or at a back-end server. In some embodiments, the AI model 157 that is trained is implemented by the deep learning engine 163 to provide various functionalities to game plays of the gaming application.

The analyzer 165 is configured to utilize the AI model 157 that is trained to provide various functionalities in relation to a game play of the gaming application. In some embodiments, a set of input state data 209 is provided as input to the analyzer 165. The analyzer 165 in turn accesses the deep learning engine 163 to query the AI model 157 for a response to the set of input state data 209. The trained AI model 157 provides an output in response to the set of input state data 209, where the output is dependent on the predefined functionality and/or predefined objective of the trained AI model 157. For example, the trained AI model 157 may be used by the analyzer 165 to determine what actions need to be taken during the game play—either by the player, or by the corresponding executing instance of the gaming application. The analyzer 165 includes an action generator 211 that is configured to determine and convey an action 159 responsive to the set of input state data 209 and in consideration of the predefined objective of the trained AI model 157. In this manner, the analyzer 165 uses the AI model 157 to provide various functionalities in the form of actions 150, including providing services to the player playing the gaming application (e.g., providing recommendations, finding weaknesses of the player, training the player, providing an opponent to the player, finding flaws in the gaming application, providing an auto-play player, training the auto-play player, etc.).

The analyzer 165 is configured to analyze the output from the trained AI model 157 for a given input (e.g., controller input 203, game state data 205, success criteria 207), and provide a response (e.g., an action 159). For example, the analyzer 165 may provide a profile of a player playing the gaming application; provide a recommendation to a player during game play of a gaming application by the player, where the recommendation may be structured in consideration of the user profile; take over the game play; build teams (e.g., teams that are competing against each other in the gaming application) that are fairly balanced using player profiles; auto play the gaming application, such as for purposes of automatically training the AI model; provide a bot opponent; explore the gaming application; determine a weakness of a corresponding player and perform services that help the player to overcome the weakness, etc.

Figure 2B:
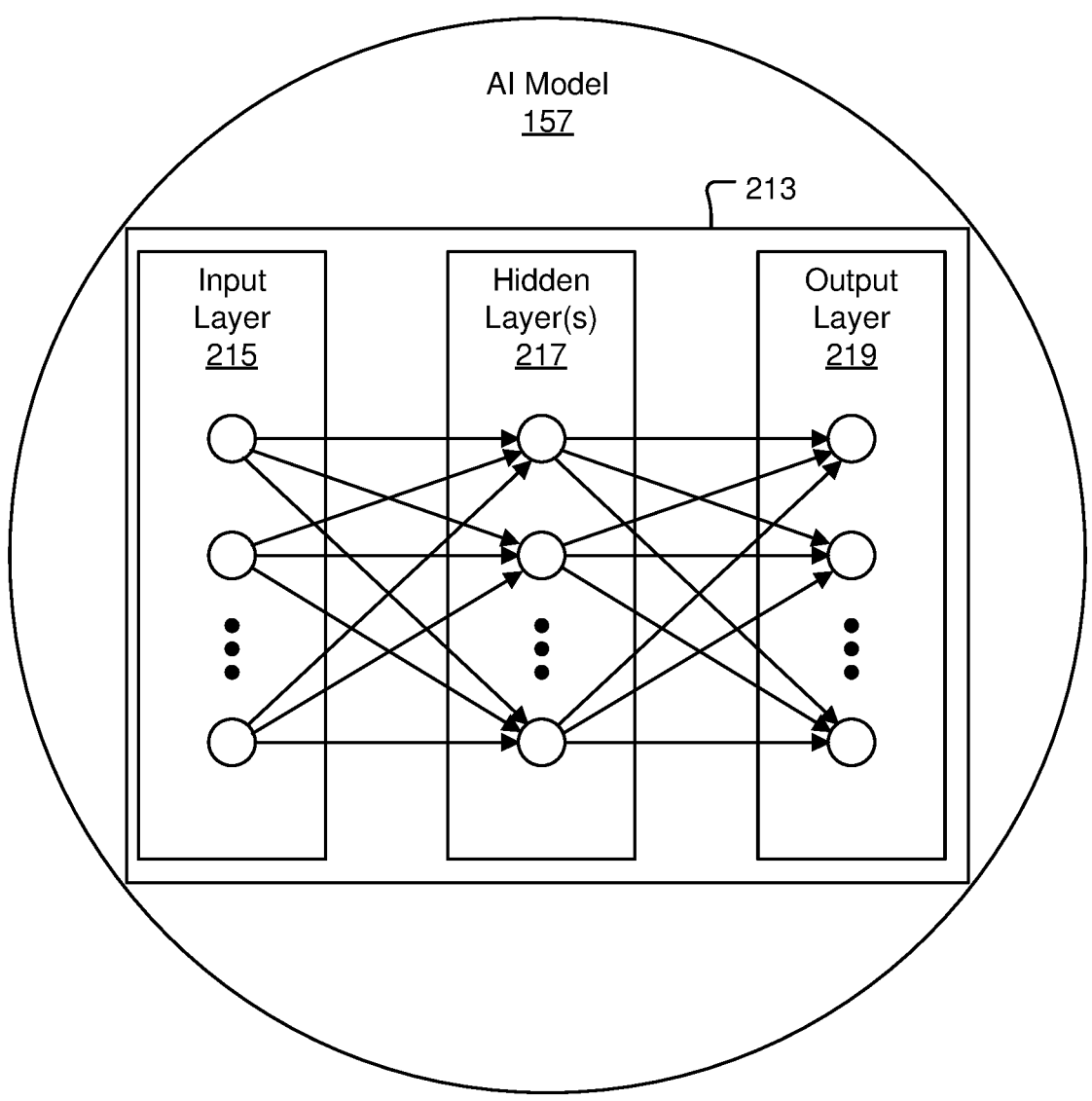
FIG. 2B shows an example AI model that implements a neural network for learning the intricacies of a gaming application and how to play the gaming application, in accordance with some embodiments.

FIG. 2B shows an example AI model 157 that implements a neural network 213 for learning the intricacies of a gaming application and how to play the gaming application, in accordance with some embodiments. Given an input defined as a condition of a game play of the gaming application, such as a game state of a particular game play, the AI model 157 can analyze the input and provide an appropriate response to the input. For example, the AI model 157 can be used to provide various functionalities in relation to a gaming application and/or to game play of the gaming application, including predicting and/or determining what actions to take in response to a given condition (e.g., game state) of the gaming application. The modeler 167 is configured to build the AI model 157 as needed to learn about the gaming application, so that the AI model 157 is equipped for use in subsequent game plays of the gaming application by any player, either real or virtual.

The deep learning engine 163 in cooperation with modeler 167 is configured to analyze the training data 155 that is collected by the cloud-based gaming system 100 executing a plurality of instances of a gaming application. The deep learning engine 163 utilizes artificial intelligence, including deep learning algorithms, reinforcement learning, or other artificial intelligence-based algorithms to build and train the AI model 157 that relates to the gaming application and/or game plays of the gaming application. In this manner, a vast collection of training data 155 may be efficiently collected, in part, to help define the AI model 157 to cover the gaming application, and/or any game play of the gaming application, so as to include the various contexts within which the gaming application may exist (e.g., different scenarios, and parts within those scenarios). The deep learning engine 163 is able to learn everything about the gaming application and/or game plays of the gaming application, so that the trained AI model 157 can be used to provide the best services for subsequent game plays of the gaming application, such as to a player or for auto-play of the gaming application. The deep learning engine 163 may be configured to continually refine the trained AI model 157 given any updated training data 155. The refinements are based on determining which sets of training data 155 can be used for training based on how those sets perform within the gaming application based on corresponding success criteria 207.

More particularly, during the learning and/or modeling phase, the training data 155 is used by the deep learning engine 163 to predict and/or determine how successful a particular game play of a gaming application will turn out given a set of input data. The resulting AI model 157 of the gaming application can then be used to determine actions to be performed, for a given game play of a gaming application given the set of input state data 209. That is, the trained AI model 157 can be used (e.g., by analyzer 165) to provide various functionalities related to a gaming application and/or game plays of the gaming application. For example, the input data may be game state data 209 (e.g., including controller input, etc.), and the trained AI model 157 may be used to generate a response to the input data. The response may be provided with or without any request or knowledge by the user. In another example, the input data may be game state data 209, and the trained AI model 157 may be used to generate controller inputs that the player should provide in response to the game state data 209.

In another example, the trained AI model 157 may be used by the analyzer 165 to provide recommendations to a player playing the gaming application. In another example, the AI model 157 may be used by the analyzer 165 to create a user profile of the player that is specific to the gaming application, or to a scenario of the gaming application. In another example, the AI model 157 may be used by the analyzer 165 to control a bot opponent within the gaming application, such as when training the player against a machine-generated opponent as created through training data, or when training the player against a virtual-me opponent so that the user is able to get incrementally better through self-play (e.g., playing against a virtual version of themselves), where the virtual-me opponent continually gets refined through that self-play. In another example, the AI model 157 may be used by the analyzer 165 to discover weaknesses of the player and to provide tutorial sessions to address those weaknesses. In another example, the AI model 157 may be used by the analyzer 165 to discover problems within the gaming application (e.g., holes in the code that lead to glitches, etc.). In another example, the AI model 157 can be used by the analyzer 165 to control a virtual player that automatically plays the game in place of the human player in an auto-play mode. In this example, the deep learning engine 163 can be configured to enable training of AI model 157 using feedback from a human player in order to train the virtual player. It should be understood that other functionalities are supported by the AI processor engine 103, though not necessarily described herein.

The neural network 213 represents an example of an automated analysis tool for analyzing data sets to determine the intricacies of playing a gaming application, to include the responses and/or actions that can be determined and/or performed during a game play of a gaming application. Different types of neural networks 213 are possible. In an example, the neural network 213 supports deep learning that may be implemented by the deep learning engine 163. Accordingly, in various embodiments, the neural network 213 can be implemented as a deep neural network, a convolutional deep neural network, and/or a recurrent neural network using supervised or unsupervised training. In some embodiments, the neural network 213 includes a deep learning network that supports reinforcement learning, or rewards based learning (e.g., through the use of success criteria, success metrics, etc.). For example, in some embodiments, the neural network 213 is set up as a Markov decision process (MDP) that supports a reinforcement learning algorithm.

Generally, the neural network 213 represents a network of interconnected nodes, such as an artificial neural network. In FIG. 2B, each circle represents a node. Each node learns some information from the training data 155. Knowledge can be exchanged between the nodes through the interconnections. In FIG. 2B, each arrow between nodes represents an interconnection. Input to the neural network 213 activates a set of nodes. In turn, this set of nodes activates other nodes, thereby propagating knowledge about the input. This activation process is repeated across other nodes until an output is provided. The example neural network 213 includes a hierarchy of nodes. At the lowest hierarchy level, an input layer 215 exists. The input layer 215 includes a set of input nodes. For example, in some embodiments, each of the input nodes of the input layer 215 is mapped to a corresponding instance of a game play of the gaming application, where the corresponding instance is defined by one or more features, such as controller input, game state, results data, etc. In some embodiments, intermediary predictions of the AI model 157 are determined through a classifier that creates labels, such as outputs, features, nodes, classifications, etc. At the highest hierarchical level, an output layer 219 exists. The output layer 219 includes a set of output nodes. Each output node represents a decision (e.g., action, prediction, prediction of success of a game play for a given set of input data, etc.) that relates to one or more components of the trained AI model 157. In various embodiments, the output nodes of the output layer 219 may identify the predicted or expected actions, or learned actions for a given set of inputs, where the inputs may define various scenarios or parts of scenarios of a gaming application. The results predicted by the AI model 157 can be compared to pre-determined and true results, or learned actions and results, as obtained from the game plays used for collecting the training data 155 in order to refine and/or modify the parameters used by the deep learning engine 163 to iteratively determine the appropriate predicted or expected responses and/or actions for a given set of inputs. The nodes in the neural network 213 learn the parameters of the trained AI model 157 that can be used to make such decisions when refining the parameters.

In some embodiments, one or more hidden layer(s) 217 exists within the neural network 213 between the input layer 215 and the output layer 219. The hidden layer(s) 217 includes "X" number of hidden layers, where "X" is an integer greater than or equal to one. Each of the hidden layer(s) 217 includes a set of hidden nodes. The input nodes of the input layer 215 are interconnected to the hidden nodes of first hidden layer 217. The hidden nodes of the last ("X$^{th}$") hidden layer 217 are interconnected to the output nodes of the output layer 219, such that the input nodes are not directly interconnected to the output nodes. If multiple hidden layers 217 exist, the input nodes of the input layer 215 are interconnected to the hidden nodes of the lowest (first) hidden layer 217. In turn, the hidden nodes of the first hidden layer 217 are interconnected to the hidden nodes of the next hidden layer 217, and so on, until the hidden nodes of the highest ("X$^{th}$") hidden layer 217 are interconnected to the output nodes of the output layer 219. An interconnection connects two nodes in the neural network 213. The interconnections in the example neural network 213 are depicted by arrows. Each interconnection has a numerical weight that can be learned, rendering the neural network 213 adaptive to inputs and capable of learning. Generally, the hidden layer(s) 217 allow knowledge about the input nodes of the input layer 215 to be shared among all the tasks corresponding to the output nodes of the output layer 219. In this regard, in some embodiments, a transformation function $f$ is applied to the input nodes of the input layer 215 through the hidden layer(s) 217. In some cases, the transformation function $f$ is non-linear. Also, different non-linear transformation functions $f$ are available including, for instance, a rectifier function $f(x)=\max(0,x)$.

In some embodiments, the neural network 213 also uses a cost function c to find an optimal solution. The cost function c measures the deviation between the prediction that is output by the neural network 213 defined as $f(x)$, for a given input x and the ground truth or target value y (e.g., the expected result). The optimal solution represents a situation where no solution has a cost lower than the cost of the optimal solution. An example of a cost function c is the mean squared error between the prediction and the ground truth, for data where such ground truth labels are available. During the learning process, the neural network 213 can use back-propagation algorithms to employ different optimization methods to learn model parameters (e.g., learn the weights for the interconnections between nodes in the hidden layer(s) 217) that minimize the cost function c. An example of such an optimization method is stochastic gradient descent.

In some embodiments, the training dataset for the neural network 213 can be from a same data domain. For example, the neural network 213 is trained for learning the predicted or expected responses and/or actions to be performed for a given set of inputs or input data. In the present context, the data domain includes game play data collected through multiple game plays of multiple users to define baseline input data. The neural network 213 may predict or determine, in-part, predicted or expected responses and/or actions to be performed for a given set of inputs (a condition of a gaming application, such as game state). Based on these predictive results, the neural network 213 may also define the trained AI model 157 that is used to provide those results and/or actions (e.g., the various functionalities relating to the gaming application and/or game plays of the gaming application) to be performed given a set of inputs.

In some embodiments, a gaming application includes one or more scenarios. A scenario may be a critical point in the gaming application (e.g., necessary to progress through the gaming application), such as combating a monster at the end of a level, or jumping over an object or obstacle that is blocking the only path to a destination, or passing an obstacle (e.g., climbing a mountain, crossing a lake or river, etc.). Also, a scenario may be less critical, such as when completing an intermediary task in the gaming application. In these cases, the scenario may involve completing the task to obtain a reward (e.g., money, in-game object, etc.). In some embodiments, the collection of training data 155 for purposes of training the AI model 157 may be limited to data that is related to game play during one or more scenarios of interest. In these embodiments, the trained AI model 157 understands the intricacies of playing the gaming application during the scenario of interest based on training data 155 that is relevant to the scenario of interest, and without contamination from data that may not be relevant to playing the scenario of interest. In some embodiments, scenarios are prioritized for training of the AI model 157. For example, a scenario that does not have enough training data 155 can be prioritized for AI model 157 training. Also, in another example, if human players have been performing significantly better in a given scenario than the AI model 157, the given scenario can be prioritized for AI model 157 training.

In some embodiments, the scenario of interest is predefined, such as by the developer of the gaming application. For example, the scenario of interest may be designed to have a high degree of difficulty, such that it is expected that many players would fail to progress through the scenario of interest. In other cases, the scenario of interest may be discovered through analysis of the collected training data 155. For example, it may become clear that a particular portion of the gaming application is difficult for players to progress through during their corresponding game plays. In this example, that particular portion of the gaming application may be identified as a scenario of interest, such that training data 155 is collected during game plays of that identified scenario of interest.

As previously mentioned, in some embodiments, success criteria 207 is defined for the training data 155, and particularly for the game state data 205. For example, the success criteria 207 may be used by the deep learning engine 163 for purposes of training the AI model 157. Specifically, the success criteria 207 may be applied to define the interrelationships between the nodes of layers 215, 217, and 219 within the neural network 213 when the AI model 157 is developed and trained by the deep learning engine 163. In some embodiments, success criteria 207 is applied to refine the weights of the interrelationships between nodes within the neural network 213 of the AI model 157. In some embodiments, the success criteria 207 is used to differentiate between training data 155 that are similar and give some insight into how to play the gaming application during the scenario of interest. For example, consider that the scenario of interest involves accomplishing a task where two sets of training data 155 each describe how to play through the scenario of interest (e.g., controller inputs, strategy, etc.). The success criteria 207 for this scenario of interest may be utilized to determine which set of training data 155 is more successful in accomplishing the task. The more successful set of training data 155 is more heavily weighted (e.g., when defining interrelationships between nodes of the AI model 157) than the other set of training data 155 that is less successful, for purposes of training the AI model 157 related to the scenario of interest within the gaming application.

The training data 155 for a scenario of interest within the gaming application is provided to the deep learning engine 163 to train the AI model 157. Because the training data 155 relates to the scenario of interest, the AI model 157 is trained to learn everything about the scenario of interest in the gaming application and/or game play of the scenario of interest based the success criteria 207. Then, when the AI model 157 is given a set of inputs (e.g., game state, controller input, etc.) related to a subsequent game play of the scenario of interest, the AI model 157 can provide an output that may be beneficial for driving game play through the scenario of interest. In some embodiments, the output of the AI model 157 may indicate a degree of success for that game play. More specifically, given the current condition of the game play (e.g., game state), the AI model 157 can predict where that game play is going and predict how successful that game play may be in progressing through the scenario of interest. In some embodiments, additional analysis of the output of the AI model 157 by the analyzer 165 in conjunction with analysis of the set of input state data 209 provides an action 159 in response to the set of input state data 209.

In some embodiments, the input state data 209 corresponds to a current, real-time play of a gaming application, and the action 159 provided by the analyzer 165 in response to the input state data 209 is conveyed to the cloud-based gaming system 100 as real-time player input controls. In this manner, the AI model 157 and the analyzer 165 work in conjunction with each other to provide for auto-play of the gaming application by an auto-play player, which may be a bot player of the gaming application or a virtual-me auto-player of the gaming application. Also, in some embodiments, if the output of the AI model 157 based on the input state data 209 indicates that the game play is leading towards being unsuccessful in progressing through the scenario of interest, the output from the AI model 157 may be used by the analyzer 165 to provide a recommendation or advice on how to better progress through the scenario of interest within the gaming application.

Figure 3:
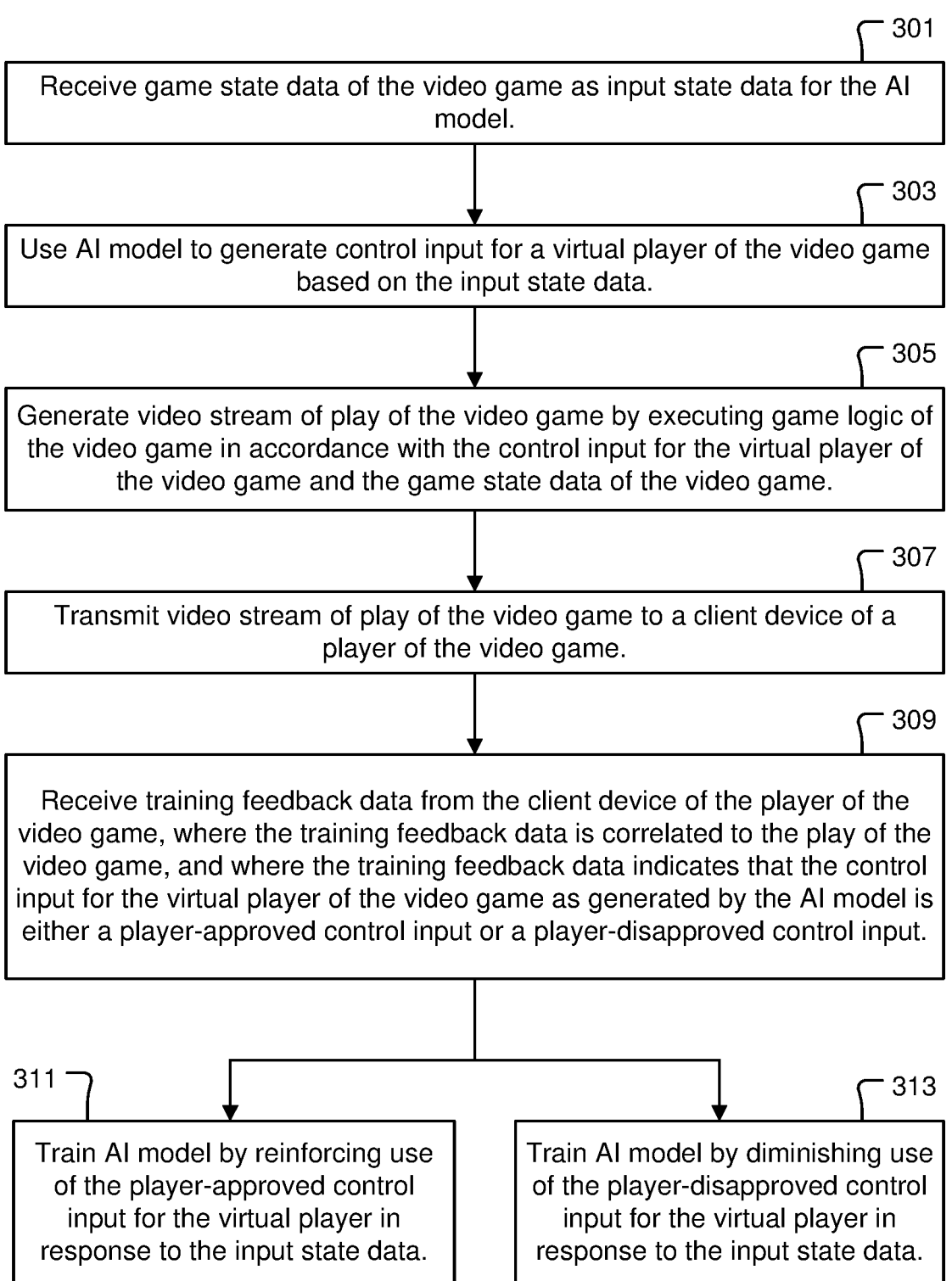
FIG. 3 shows a flowchart of a method for training the AI model for play of a video game, in accordance with some embodiments.

FIG. 3 shows a flowchart of a method for training the AI model 157 for play of a video game, in accordance with some embodiments. In some embodiments, the method of FIG. 3 is initiated by a human game player selecting to enter an AI player (or auto-player) training mode in which the human game player's in-game player control capability is transferred to the AI model 157 by way of the analyzer 165. In some embodiments, the human game player can terminate the method of FIG. 3 at any time in order to exit the AI player (or auto-player) training mode and return to normal game play under the control of the human game player.

The method includes an operation 301 for receiving game state data of the video game as input state data 209 for the AI model 157. As previously discussed, the game state data of the video game defines a state of game play of the video game by a particular player at a particular point in time. The input state data 209 is a snapshot of the game state data for use by the analyzer 165 as input to the AI model 157. In some embodiments, the input state data 209 corresponds to a particular scenario within the game play of the video game.

The method proceeds with an operation 303 for using the AI model 157 to generate control input for a virtual player of the video game based on the input state data 209. In some embodiments, the operation 303 is directed by the analyzer 165, and the generated control input is conveyed as the actions 159 back to the cloud-based gaming system 100 to drive game play of the video game.

In some embodiments, the control input for the virtual player of the video game (generated as output by the AI model 157) is one or more of a number of control inputs that would be available for use by the human player of the video game in response to a state of play of the video game corresponding to the input state data 209. In some embodiments, the control input for the virtual player of the video game (generated as output by the AI model 157) is one or more control input signals generatable by a game controller device. In other words, in some embodiments, a range of options for the control input for the virtual player of the video game (generated as output by the AI model 157) is limited to a same range of options for control input that would be available to the human player of the video game. In this manner, the virtual game play capability of the AI model 157 does not exceed a potential game play ability that is available to the human player.

The method proceeds with an operation 305 for generating a video stream of play of the video game by executing game logic of the video game in accordance with the control input for the virtual player of the video game as generated by the AI model 157 and the game state data of the video game. Then, in an operation 307, the video stream of play of the video game is transmitted to the client device 105-x of the human player of the video game.

In an operation 309, training feedback data is received from the client device 105-x of the human player of the video game. It should be understood that the training feedback data is separate and different from the previously discussed training data 155. The training feedback data received in the operation 309 includes a time-dependent series of feedback elements correlated to the play of the video game as transmitted in the operation 307. Each feedback element in the time-dependent series of feedback elements indicates that the control input for the virtual player of the video game as generated by the AI model 157 is either a player-approved control input or a player-disapproved control input. More specifically, some of the feedback elements are one or more signals that indicate approval by the human game player of the control input that was automatically generated by the AI model 157 to control the virtual player of the video game. Also, some of the feedback elements are one or more signals that indicate disapproval by the human game player of the control input that was automatically generated by the AI model 157 to control the virtual player of the video game.

In some embodiments, at least some of the feedback elements received in the operation 309 is one or more controller signals generated by a game controller device at the client device 105-*x* of the human player. For example, in some embodiments, activation of a particular game controller device button, e.g., X button, sends a signal representing a feedback element that indicates human player approval of the control input for the virtual player as automatically generated by the AI model 157. In another example, in some embodiments, activation of a particular game controller device button, e.g., O button, sends a signal representing a feedback element that indicates human player disapproval of the control input for the virtual player as automatically generated by the AI model 157. Also, in some embodiments, activation of a particular combination of game controller device buttons, e.g., e.g., X button plus right trigger, sends a signal representing a feedback element that indicates a more significant approval by the human player of the control input for the virtual player as automatically generated by the AI model 157. Also, in some embodiments, activation of a particular combination of game controller device buttons, e.g., e.g., O button plus left trigger, sends a signal representing a feedback element that indicates a more significant disapproval by the human player of the control input for the virtual player as automatically generated by the AI model 157. It should be understood that the game controller device buttons mentioned above are provided by way of example. In various embodiments, the AI processor engine 103 can be configured to use essentially any game controller device generated signal or combination of signals to represent each of human player approval, significant approval, disapproval, and significant disapproval, among other characterizations, of the control input for the virtual player as automatically generated by the AI model 157.

In some embodiments, the training feedback data received in operation 309 is not limited to game controller inputs. For example, in some embodiments, at least some of the feedback elements is one or more audio signals captured at the client device 105-*x* of the human player of the video game, such as "yes," "no," "good," "bad," etc. Also, in some embodiments, at least some of the feedback elements is one or more gestures made by the human player of the video game as detected within a video recorded at the client device 105-*x* of the human player of the video game, such as thumbs up, thumbs down, arms up, arms down, etc. Also, in some embodiments, at least some of the feedback elements are based on human sentiment, mood, and/or biological response. For example, in some embodiments, a positive or a negative evaluation of the AI-based game play of the virtual player is inferred from feedback elements such as a human player's tone of voice, volume of voice, eye and/or pupil activity, heart rate, galvanic skin response (GSR), and/or another measure of the human player's sentiment, mood, and/or biological response.

In some embodiments, at least some of the feedback elements received in the operation 309 are crowdsourced. For example, in some embodiments, the video stream of play of the video game by virtual player as generated by the AI model 157 is broadcast to a crowd of people, and each person in the crowd is able to provide explicit feedback on the AI-based video game play of the virtual player, such as by activating a like button or a dislike button. Also, in some embodiments, the video stream of play of the video game by virtual player as generated by the AI model 157 is broadcast to a crowd of people, and the response of each person in the crowd is determined in order to provide implicit feedback on the AI-based game play of the virtual player, such as by determining who or how many of the persons in the crowd switch away from watching the video stream of the AI-based video game play of the virtual player.

In some embodiments, at least some of the feedback elements received in the operation 309 are provided by a discriminator AI model. More specifically, in some embodiments, the human-generated feedback elements received in the operation 309, e.g., thumbs up, thumbs down, like, dislike, etc., are used to generate and train the discriminator AI model. The discriminator AI model is in turn used to automatically provide AI-based training feedback data as a time-dependent series of feedback elements correlated to the play of the video game by the AI model 157-based virtual player as transmitted in the operation 307. Use of the AI-based training feedback data generated by the discriminator AI model provides for rapid training of the AI model 157-based virtual player through a large number of scenarios. In some embodiments, the discriminator AI model is configured to recognize when an insufficient amount of human-generated feedback element data has been received for enabling reasonable assessment of the play of the video game by the AI model 157-based virtual player in a given scenario. In some embodiments, upon recognizing that the amount of received human-generated feedback element data for a given scenario is not sufficient, the discriminator AI model is configured to shift assessment of the play of the video game by the AI model 157-based virtual player in the given scenario from the discriminator AI model to human-based assessment in accordance with human-generated training feedback data received from the client device 105-*x* or from crowdsourcing of feedback data.

In some embodiments, observations of human players playing the video game are used to implicitly generate training feedback data for the AI model 157 for a given scenario. In some embodiments, when players' actions are inconsistent within a given scenario or when there is not sufficient feedback data for a given scenario, the players are explicitly asked to provide training feedback data for the given scenario. In these embodiments, a hybrid system is implemented to train the AI model 157, where the hybrid system acts as a supervised learning system that sometimes needs help from a human expert when there aren't enough samples.

In some embodiments, the AI model 157 may perform multiple simultaneous actions in a given scenario of the video game. In some embodiments, the training feedback data received in operation 309 is parsed among the different multiple actions that are simultaneously performed by the AI model 157 in the given scenario. For example, if the AI model 157 simultaneously jumps and throws, the training feedback data received in operation 309 can be parsed between jumping and throwing, such that the act of jumping can be independently assessed positively or negatively, and such that the act of throwing can be independently assessed positively or negatively. For example, in some embodiments, the training feedback data received from the client device 105-*x* may be something along the lines of "bad jump, good throw," or "good jump, bad throw," or "bad jump, bad throw," or "good jump, good throw." This training feedback data is parsed so that the actions of jumping and throwing are correctly assessed. In some embodiments, the player is able to create a masked feedback setup so that feedback data provided by the player is attributed just to certain actions within a scenario. For example, if the player wants to provide feedback on jumping, but not on throwing, during a given scenario of the video game, the player can create a masked feedback setup indicating that whatever feedback is provided by the player is to be attributed to jumping actions, but not to throwing actions. Then, with the masked feedback setup in place, the player can provide feedback by simply saying "good" or "bad" without having to specify that the feedback is just for jumping actions. It should be appreciated that the examples of jumping and throwing in a given scenario are provided to facilitate description. The principles of parsing training feedback data among the different multiple actions that are simultaneously performed by the AI model 157 in a given scenario are applicable to essentially any number and types of actions or events in any conceivable scenario of a video game. Similarly, the principles of creating and using a masked feedback setup for assessing the performance of the AI model 157 in a given scenario are applicable to essentially any number and types of actions or events in any conceivable scenario of a video game.

The method further includes operations 311 and 313 that proceed from the operation 309. In the operation 311, the AI model 157 is trained by reinforcing use of the player-approved control input for the virtual player in response to the input state data 209. The positive reinforcement AI model 157 training of operation 311 will cause the AI model 157 to be more likely to again output the same player-approved control input for the virtual player when the same (or similar) input state data 209 is received by the AI model 157 again in the future. In some embodiments, use of the player-approved control input for the virtual player by the AI model 157 in response to the input state data 209 is reinforced by increasing a weight of an interconnection between neural nodes within the neural network 213 of the AI model 157.

Conversely, in the operation 313, the AI model 157 is trained by diminishing (reducing) use of the player-disapproved control input for the virtual player in response to the input state data 209. The negative reinforcement AI model 157 training of operation 311 will cause the AI model 157 to be less likely to again output the same player-disapproved control input for the virtual player when the same (or similar) input state data 209 is received by the AI model 157 again in the future. In some embodiments, use of the player-disapproved control input for the virtual player by the AI model 157 in response to the input state data 209 is diminished (reduced) by decreasing the weight of the interconnection between neural nodes within the neural network 213 of the AI model 157.

Figure 4B:
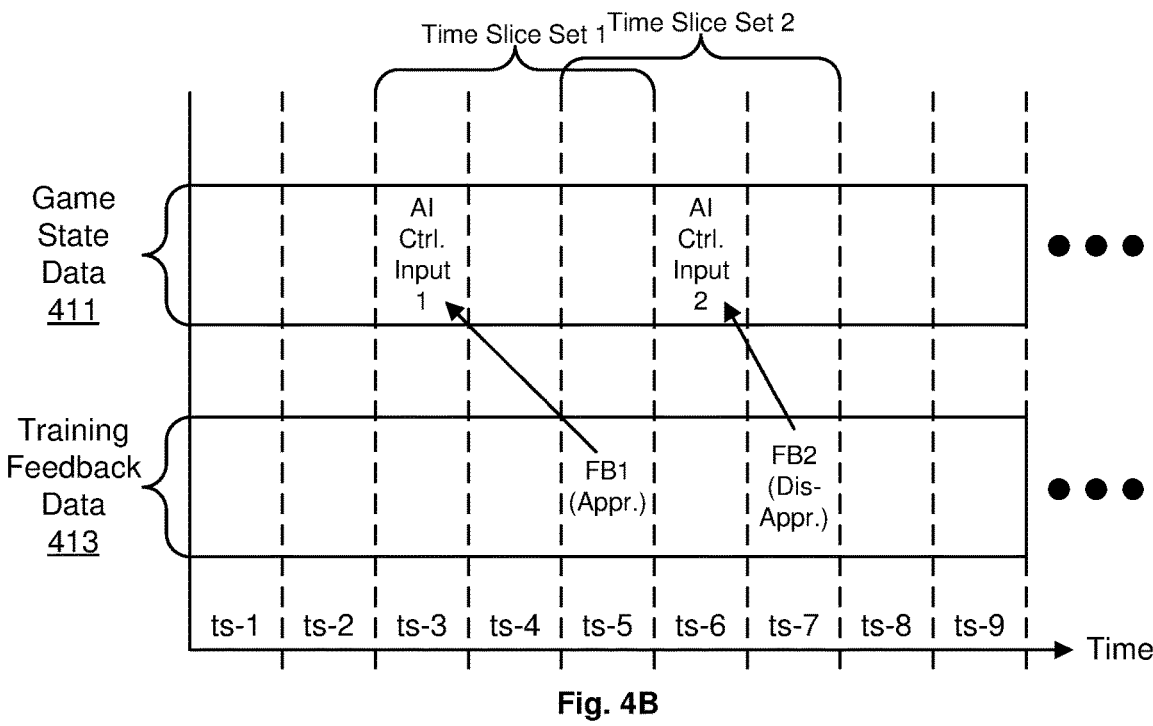
FIG. 4B shows a diagram that depicts an example of collective time-slicing of game state data of the video game and corresponding training feedback data that includes the time-dependent series of feedback elements, in accordance with some embodiments.

In some embodiments, the method includes an operation for correlating the time-dependent series of feedback elements to the play of the video game by associating a given feedback element with an immediately preceding control input for the virtual player of the video game as generated by the AI model 157. FIG. 4A shows a flowchart of a method for correlating the time-dependent series of feedback elements to the play of the video game, in accordance with some embodiments. In some embodiments, the method of FIG. 4A is performed as part of performing the operation 309 of the method of FIG. 3. The method of FIG. 4A includes an operation 401 for collective time-slicing the game state data of the video game and the time-dependent series of feedback elements into a series of time slices. FIG. 4B shows a diagram that depicts an example of collective time-slicing of game state data 411 of the video game and corresponding training feedback data 413 that includes the time-dependent series of feedback elements, in accordance with some embodiments. FIG. 4B shows that the game state data 411 is received as a stream of data over time. Similarly, the training feedback data 413 is received as a stream of data over time. In this manner, both the game state data 411 and the training feedback data 413 are time-sliced, such that each time-slice of the game state data 411 has a corresponding time-slice of the training feedback data 413, and vice-versa. For example, FIG. 4B shows that the example game state data 411 and the example training feedback data 413 are time-sliced into time slices ts-1 to ts-9, and so on. Each region between adjacent vertical dashed lines in FIG. 4B represents one of the time slices ts-1 to ts-9.

With reference back to FIG. 4A, the method continues with an operation 403 for identifying a given feedback element within a given time slice. For example, in the diagram of FIG. 4B, the operation 403 will identify the feedback element FB1 (Approval) in time-slice ts-of the training feedback data 413. Also, the operation 403 will identify the feedback element FB2 (Disapproval) in time-slice ts-7 of the training feedback data 413. The method of FIG. 4A continues with an operation 405 for searching the game state data 411 over a set of time slices in reverse temporal order for an immediately preceding control input for the virtual player of the video game as generated by the AI model 157 relative to the given feedback element identified in the operation 403. The set of time slices searched in the operation 405 includes the given time slice that includes the given feedback element identified in the operation 403. The method also includes an operation 407 for identifying the immediately preceding control input for the virtual player of the video game as generated by the AI model 157 in the game state data 411 relative to the given feedback element identified in the operation 403.

For example, in the diagram of FIG. 4B, the set of time slices is defined as three consecutive time-slices. Therefore, in the example of FIG. 4B, with regard to the feedback element FB1 (Approval), the operation 405 includes reverse-temporal searching of the game state data 411 over the set of time slices designated Time Slice Set 1, which includes searching of the game state data 411 over time-slice ts-5, then over time-slice ts-4, and then over time-slice ts-3, to find an occurrence of a control input for the virtual player as automatically generated by the AI model 157 that is temporally closest to and before the given feedback element identified in the operation 403. In this example, reverse temporal searching through Time Slice Set 1 from the time-slice ts-5 that includes the feedback element FB1 (Approval) results in identification of AI Control Input 1 in time-slice ts-3, per operation 407. Similarly, with regard to the feedback element FB2 (Disapproval), the operation 405 includes reverse-temporal searching of the game state data 411 over the set of time slices designated Time Slice Set 2, which includes searching of the game state data 411 over time-slice ts-7, then over time-slice ts-6, and then over time-slice ts-5, to find an occurrence of a control input for the virtual player as automatically generated by the AI model 157 that is temporally closest to and before the given feedback element FB2 (Disapproval). In this example, reverse temporal searching through Time Slice Set 2 from the time-slice ts-7 that includes the feedback element FB2 (Disapproval) results in identification of AI Control Input 2 in time-slice ts-6, per operation 407.

It should be understood that a size of the set of time slices that are searched in reverse temporal order for the AI generated control input that immediately precedes a given feedback element can vary in different embodiments, e.g., between different games and/or between different game scenarios. For example, if a given game state or game scenario includes fast action in which control inputs are rapidly generated by the AI model 157 in response to game play, the duration of each time-slice can be reduced and/or the size of the set of time-slices that are searched in reverse temporal order from a given feedback element can be reduced. Conversely, if a given game state or game scenario includes slow action in which control inputs are slowly generated by the AI model 157 in response to game play, the duration of each time-slice can be increased and/or the size of the set of time-slices that are searched in reverse temporal order from a given feedback element can be increased. Also, in some embodiments, the player is able to manipulate the starting time and ending time of time slices for a given scenario of the video game.

The method of FIG. 4 further includes an operation 409 for associating the given feedback element with the immediately preceding control input for the virtual player of the video game as generated by the AI model 157. For example, in the scenario of FIG. 4B, the feedback element FB1 (Approval) is associated with the AI Control Input 1, as generated by the AI model 157 and executed during automatic game play via the analyzer 165. Also, the feedback element FB2 (Disapproval) is associated with the AI Control Input 2, as generated by the AI model 157 and executed during automatic game play via the analyzer 165. In some embodiments, the feedback element-to-AI-generated control input associations from operation 409 are stored in a computer memory of the AI processor engine 103. In some embodiments, a player is able to manually identify specific time slices for which training feedback data 413 is provided. In these embodiments, a player can manually specify that a given feedback element is associated with a given AI control input. In some embodiments, manual identification of the specific time slice(s) for which training feedback data 413 is provided by the player is done by the player providing a verbal description of the scenario in conjunction with providing the feedback element. For example, in a scenario that includes a horse jumping over a hurdle, the player could say "hurdle jump started too soon." The system is able to determine that the phrase "too soon" is a negative (disapproval) feedback element that is associated with the temporally preceding action (AI control input) of "hurdle jump." It should be understood that player-assisted correlation of training feedback data to AI control inputs can be implemented in different ways, such as through voice/speech processing, controller button activations, video-captured player gestures, among essentially any method/mechanism by which a player can provide input to the system.

Figure 4C:
FIG. 4C shows an example database schema that may be used to store the feedback element-to-AI-generated control input associations in the computer memory of the AI processor engine, in accordance with some embodiments.
Figure 4C:
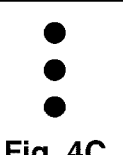
Figure 4C:
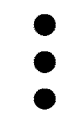

FIG. 4C shows an example database schema that may be used to store the feedback element-to-AI-generated control input associations from operation 409 in the computer memory of the AI processor engine 103, in accordance with some embodiments. The example of FIG. 4C shows a record indicating that within a given game state instance "34097," the feedback element "FB1 (Approval)" is correlated to the control input "AI Control Input 1" as generated by the AI model 157, where the feedback element "FB1 (Approval)" directs reinforcement of use of the control input "AI Control Input 1" in the connection with the given game state instance "34097." The example of FIG. 4C also shows a record indicating that within the given game state instance labeled "34097," the feedback element "FB2 (Disapproval)" is correlated to the control input "AI Control Input 2" as generated by the AI model 157, where the feedback element "FB2 (Disapproval)" directs diminishment (reduction) of use of the control input "AI Control Input 2" in the connection with the given game state instance labeled "34097."

Figure 5:
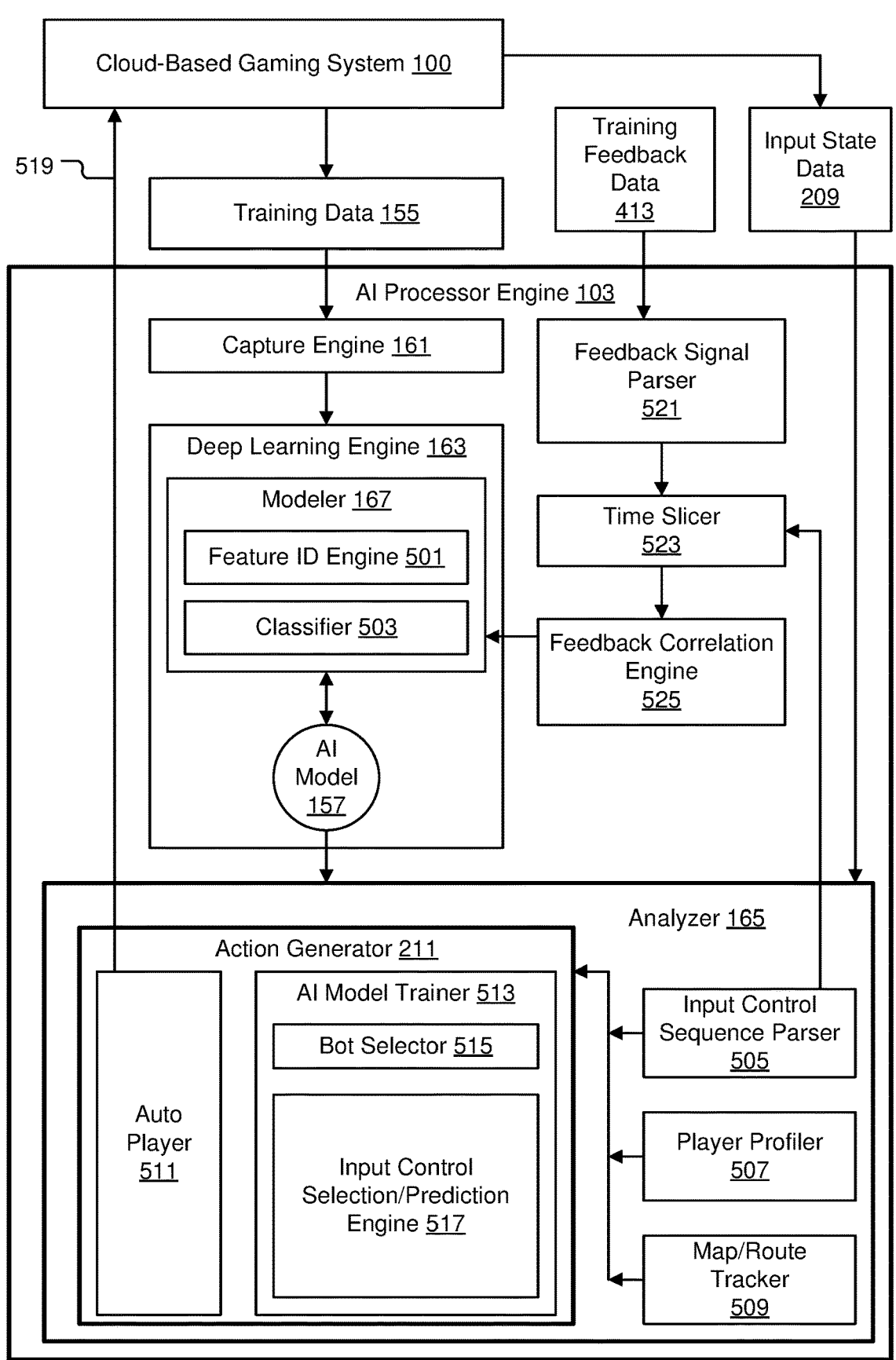
FIG. 5 shows a diagram of the AI processor engine configured to implement the methods of FIGS. 3 and 4A for training the AI model for automatic play of a video game, in accordance with some embodiments.

FIG. 5 shows a diagram of the AI processor engine 103 configured to implement the methods of FIGS. 3 and 4A for training the AI model 157 for automatic play (auto-play) of a video game, in accordance with some embodiments. As previously described with regard to FIG. 2A. AI processor engine 103 receives the training data 155 from the cloud-based gaming system 100. The AI processor engine 103 also receives current game state data as the input state data 209. The AI processor engine 103 also receives the training feedback data 413 as input. As previously described with regard to FIG. 2A, the AI processor engine 103 also includes the capture engine 161, the deep learning engine 163, and the analyzer 165. The deep learning engine 163 includes the modeler 167 and the AI model 157.

The modeler 167 is configured for training and/or building the AI model 157 using the training data 155 based one or more success criteria. In some embodiments, the modeler 167 implements AI through various neural networks, e.g., convolutional, recurrent, etc. In some embodiments, the modeler 167 implements AI through various algorithms, including by way of example for purposes of illustration, deep learning algorithms, reinforcement learning algorithms, supervised learning algorithms, unsupervised learning algorithms, rewards based learning algorithms (e.g., through the use of success criteria, success metrics, etc.), incremental learning algorithms, training feedback signal based algorithms, among other algorithms. In some embodiments, the modeler 167 is configured to identify a set of feature-dependent rules that make predictions given a set of inputs (e.g., features that may define a context or condition, such as a game state, of a gaming application) when building the AI model 157. The predictions may include how successful a given set of inputs may be when playing a scenario of the video game. Correspondingly, the AI model 157 can be used to determine actions to be taken given the set of inputs.

In some embodiments, the modeler 167 includes a feature identification engine 501 configured to identify a plurality of features within the training data 155. For each game play of a corresponding scenario, the training data 155 includes features. For example, at a particular point in the game play, an instance of the training data 155 is collected. The instance of the training data 155 includes one or more features, such as variables, parameters, controller inputs, game state metadata, among other features. The feature identification engine 501 is configured to parse through the training data 155 for purposes of identifying and/or extracting features from the training data 155. In some embodiments, the feature identification engine 501 is configured to learn features. At each training cycle through the deep learning engine 163, a training instance (e.g., set of features) is provided as input, where the training instance may be associated with a particular point in the game play of the scenario. In this manner, the deep learning engine 163 is configured to incrementally learn about the gaming application, the scenario of the gaming application, and/or game play of the scenario of the gaming application.

The modeler 167 is configured to learn rules defining relationships between features and outputs (e.g., predictions, actions, etc.), where features may be defined within one or more nodes that are located at one or more hierarchical levels of the AI model 157 being trained. The modeler 167 builds the AI model 157 by linking the features between the layers such that a given input set of data leads to a particular output of the AI model 157. The modeler 167 is configured to generate the features and/or nodes of the AI model 157, as defined by rules that link the features at the various layers. For example, a rule may link (e.g., using relationship parameters including weights) one or more features or nodes through the AI model 157 between an input and an output. In some embodiments, one or more linked features make a rule. The AI model 157 is trained and includes a set of the rules, where each rule corresponds to a labeled or classified output of the AI model 157.

In some embodiments, in the modeler 167, the identified features as identified and/or extracted from the training data 155 by the feature identification engine 501 are delivered to a classifier 503. The classifier 503 is configured to learn rules defining relationships between features and outputs of the AI model 157 (e.g., predictions, actions, etc.). The features may be defined within one or more nodes that are located at one or more hierarchical levels of the AI model 157. Each feature may be linked with one or more features at other layers, where one or more relationship parameters define interconnections between one feature in one layer of the AI model 157 and another feature in another layer of the AI model 157.

For example, the classifier 503 is configured to determine to which label or output a set of features (the set making a rule) belongs. A rule links a given set of features which may be defined as nodes within the AI model 157 to a specific output that is labeled by the classifier 503. For example, a rule may link one or more features or nodes (the links or interrelationships between features defined through one or more relationship parameters) through the AI model 157 between an input and an output. The classifier 503 may be configured to generate the features and/or nodes of the AI model 157, wherein the features and/or nodes are used to define the rules, as described above. The output of the AI model 157 may be associated with a label that is generated, assigned, and/or determined by the classifier 503.

The learned rules may be learned paths and/or learned patterns through the nodes or features of the AI model 157 that lead to an output node of the AI model 157 for a given set of inputs and/or input data relating to game play of a scenario of a gaming application. For example, one or more linked features and/or nodes make a rule. The trained AI model 157 is a set of the rules and labels (outputs). In a supervised learning environment, the output is predetermined for a given set of features, and the deep learning engine 163 learns the rule that links the set of features through the labels to the output. In an unsupervised learning environment, the given set of features are not automatically tied to an output, and the rule may be learned by looking for similarities or clusters of data points relating to other similar sets of features. Clusters may be preferred over other clusters depending on success criteria defined for training of the AI model 157. In either case, an existing rule for the input set of features may be matched, or a new rule may be generated for the input set of features. The new rule is most likely similar to or an evolution of an existing rule or rules. The resulting output according to the learned rule of the AI model 157 may predict how successful the corresponding input set of features may be when used to play the scenario of the gaming application. Further, the output from the AI model 157 (and optionally the input set of features) may be used by the analyzer 165 to determine a course of action to be taken for that particular point in the game play of the scenario (as determined by the condition or game state of the gaming application indicated by the input set of data). For example, the action may include a set of controller inputs to be suggested as a recommendation, control commands for the gaming application to respond to the inputs, etc. One or more rules may be generated for a given set of features, or similar sets of features. Depending on the corresponding success criteria or reward criteria, one rule may be preferred for a given set of features or similar set of features. For a given set of features, the output that is most successful may be chosen for the given set of features. That is, for a given set of features (e.g., input), the most successful rule (and output) is chosen to be used within the trained AI model 157, which is evidence of incremental learning.

The modeler 167 builds and/or outputs the trained AI model 157, which links the learned paths and/or learned patterns (e.g., linking labels of the AI model 157) to a given set of inputs and/or input data relating to game play of a scenario of a gaming application. The AI model 157 can be later used to provide one or more functionalities related to the gaming application and/or game play of the gaming application. That is, given a set of inputs that may indicate a condition of a subsequent game play by a player, the resulting output of the trained AI model 157 can be used by the analyzer 165 to predict and/or determine the best course of action to be taken for that particular point in the game play of the scenario as defined by the corresponding set of input data. An action may be performed based on the output from the AI model 157. For example, the trained AI model 157 may provide a recommendation to the player to advance his or her game play. Other functionalities may also be determined and generated based on the output of the AI model 157 for a given input set of data, where the functionalities are manifested in the form of an output or action. For example, the output of the AI model 157 can be used to automatically generate player game controller inputs that are automatically supplied to the cloud-gaming system 100 to implement an auto-play of the gaming application.

In some embodiments, the analyzer 165 includes an input control sequence parser 505, a player profiler 507, and a map/route tracker 509. In some embodiments, the input control sequence parser 505 is configured to determine the sequence of controller inputs used by the player to control the game play from the game state data. In some embodiments, the player profiler 507 is configured to perform profiling of the player of the gaming application (e.g., determine skill level of the player, among essentially any other profiling operation). In some embodiments, the map/route tracker 509 is configured to track the progress of the game play, including tracking the progress through a gaming environment or scenario of the game.

In some embodiments, the action generator 211 of the analyzer 165 includes an auto player 511 that is configured to automatically play the gaming application as directed by the AI model trainer 513, according to a predefined objective. For example, the predefined objective may be to automatically play the gaming application by using the AI model 157 to provide game controller inputs for the auto-player of the gaming application, so that the human player can provide training feedback data 413 on the automatic game play in order to train the AI model 157. In some embodiments, the auto player 511 is configured to automatically play the gaming application, as directed by the AI model 157 via the analyzer 165. For example, for a given set of training data 155 corresponding to automatic play of the gaming application, a learned output of the AI model 157 may be analyzed by the analyzer 165 to determine the next set of controller inputs for controlling the corresponding game play, where the next set of controller inputs are conveyed to the cloud-based gaming system 100 to automatically continue play of the gaming application. In some embodiments, a bot selector 515 and an input control selection/prediction engine 517 of the AI model trainer 513 are collectively configured to determine the next set of controller inputs depending on the objective. For example, the bot selector 515 may select a bot that is optimized for getting the through the game with the best success and efficiency, or exploring the different permutations of the gaming application, etc. Then, depending on the objective, the input control selection/prediction engine 517 is configured to predict what the next set of controller inputs would be given the objective and the selected bot. The next set of controller inputs are delivered to the auto-player 511, which then sends the controller inputs to the corresponding instance of the gaming application executing on the cloud-based gaming system 100, as indicated by arrow 519, in order to support a corresponding game play.

In addition to implementing auto-play of a gaming application through use of the AI model 157 and analyzer 165, the AI processor engine 103 is also configured to implement the methods for training the AI model 157 for automatic play of the gaming application. Specifically, in some embodiments, the AI processor engine 103 includes a feedback signal parser 521, a time slicer 523, and a feedback correlation engine 525. The feedback signal parser 521 is configured to receive the training feedback data 413 from the client device 105-*x* of the human player. The feedback signal parser 521 analyzes the incoming stream of training feedback data 413 to extract feedback elements and construct the time-dependent series of feedback elements for use in training the AI model 157, such as described with regard to FIGS. 4A-4C. The time slicer 523 is configured to receive as inputs both the time-dependent series of feedback elements from the feedback signal parser 521 and a time-dependent series of player controller inputs from the input control sequence parser 505. The time-dependent series of player controller inputs is extracted from the stream of game state data 411 by the input control sequence parser 505. The time slicer 523 is configured to output collectively time-sliced versions of the time-dependent series of feedback elements and the time-dependent series of player controller inputs, which are provided as inputs to the feedback correlation engine 525, such as described with regard to FIGS. 4A-4C. The feedback correlation engine 525 is configured to implement the method of FIG. 4A to identify and record correlations between feedback elements and AI-generated controller inputs, where each feedback element can indicate either approval or disapproval of a correlated controller input that was used in the auto-play of the gaming application. The feedback element-to-controller input correlations that are identified and recorded by the feedback correlation engine 525 are provided to the modeler 167 for training of the AI model 157 as described with regard to FIGS. 3 and 4A. It should be understood that the configuration of the AI processor engine 103 is provided by way of example. In various embodiments, the AI processor engine 103 can be configured in alternative ways while retaining an equivalent overall functionality.

Figure 6:
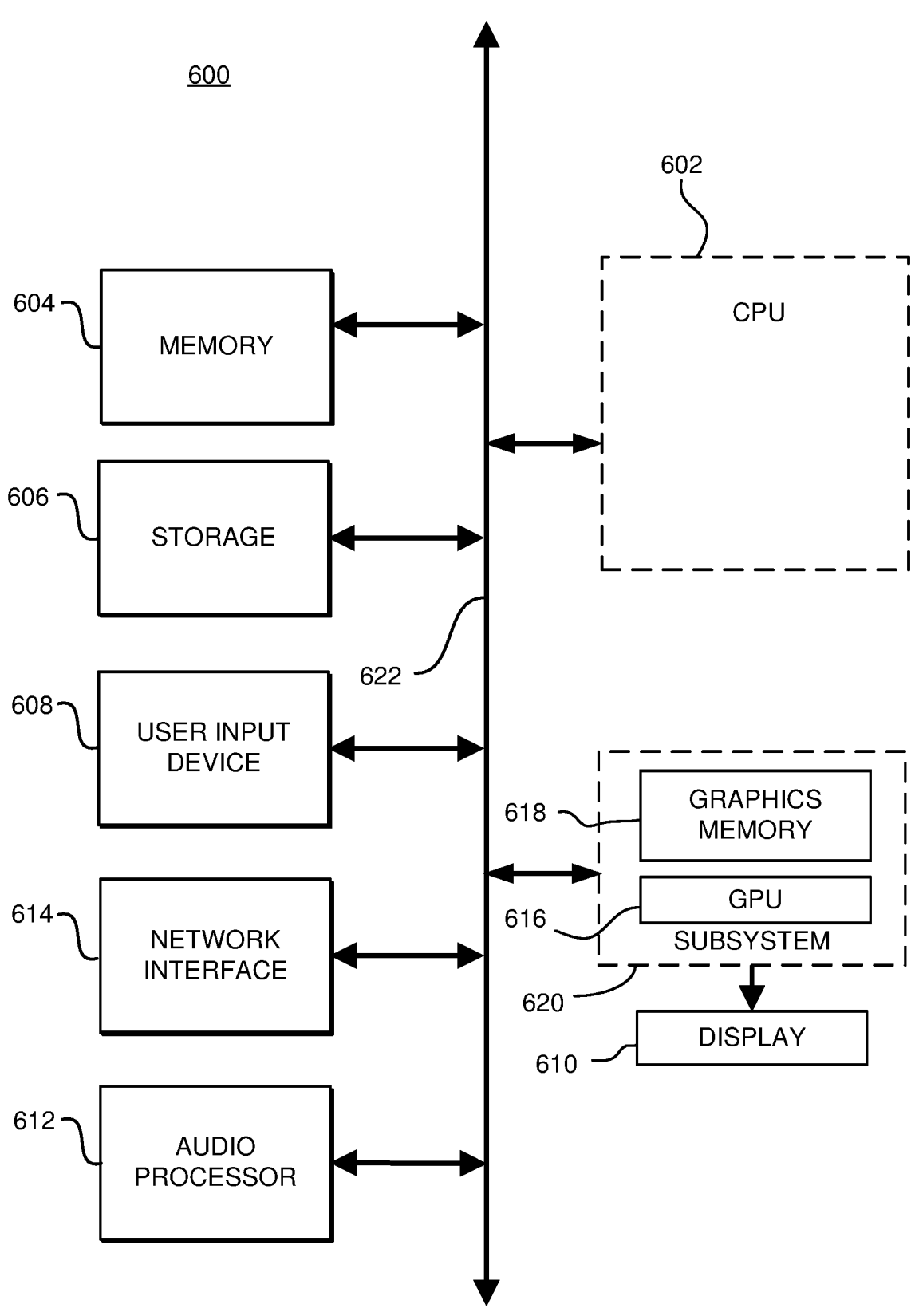
FIG. 6 illustrates components of an example server device within the cloud-based gaming system that can be used to perform aspects of the various embodiments of the present disclosure, in accordance with some embodiments.

FIG. 6 illustrates components of an example server device 600 within the cloud-based gaming system 100 that can be used to perform aspects of the various embodiments of the present disclosure, in accordance with some embodiments. This block diagram illustrates the server device 600 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be localized to a player playing a game segment (e.g., game console), or remote from the player (e.g., back-end server processor), or one of many servers using virtualization in the cloud-based gaming system 100 for remote streaming of game play to client devices.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 614, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 616, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 620 periodically outputs pixel data for an image from graphics memory 618 to be displayed on display device 610. Display device 610 can be any device capable of displaying visual information in response to a signal from the device 600, including CRT, LCD, plasma, and OLED displays. In addition to display device 610, the pixel data can be projected onto a projection surface. Device 600 can provide the display device 610 with an analog or digital signal, for example.

It should be noted, that access services, such as providing access to games of the current embodiments, delivered over a wide geographical area often use cloud-based computing. Cloud-based computing is a style of computing in which dynamically scalable and often virtualized resources are provided as a service over the Internet. Users do not need to be an expert in the technology infrastructure in the "cloud" that supports them. Cloud-based computing can be divided into different services, such as Infrastructure as a Service (IaaS), Platform as a Service (PaaS), Gaming as a Service (GaaS), and Software as a Service (SaaS). Cloud-based computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help function, etc. While game engines may sometimes be executed on an operating system virtualized by a hypervisor of a particular server, in other embodiments, the game engine itself is distributed among a plurality of processing entities, each of which may reside on different server units of a data center.

In some embodiments, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via the cloud-based gaming system 100, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud-based gaming system 100 via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the game server of the cloud-based gaming system 100, without being required to communicate such inputs through the client device first. For example, the controller might connect to a local networking device (such as the aforementioned router) to send to and receive data from the game server. Thus, while the client device may still be required to receive video output from the cloud-based video game and render it on a local display, input latency can be reduced by allowing the controller to send inputs directly over the network to the game server of the cloud-based gaming system 100, bypassing the client device.

In one embodiment, a networked controller and client device can be configured to send certain types of inputs directly from the controller to the game server of the cloud-based gaming system 100, and other types of inputs via the client device. For example, inputs whose detection does not depend on any additional hardware or processing apart from the controller itself can be sent directly from the controller to the game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the game server. These might include captured video or audio from the game environment that may be processed by the client device before sending to the game server. Additionally, inputs from motion detection hardware of the controller might be processed by the client device in conjunction with captured video to detect the position and motion of the controller, which would subsequently be communicated by the client device to the game server. It should be appreciated that the controller device in accordance with various embodiments may also receive data (e.g., feedback data) from the client device or directly from the game server.

In some embodiments, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD, the real-world objects, and inertial sensor data from the Inertial Motion Unit (IMU) sensors, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to the cloud-based gaming system 100 over the network 103. In some embodiments, the cloud-based gaming system 100 maintains and executes the video game being played by the user. In some embodiments, the cloud-based gaming system 100 is configured to receive inputs from the HMD and the interface objects over the network 103. The cloud-based gaming system 100 is configured to process the inputs to affect the game state of the executing video game. The output from the executing video game, such as video data, audio data, and haptic feedback data, is transmitted to the HMD and the interface objects. In other implementations, the HMD may communicate with the cloud-based gaming system 100 wirelessly through alternative mechanisms or channels such as a cellular network. Additionally, though implementations in the present disclosure may be described with reference to the HMD, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

As noted, implementations of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code (program instructions) on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of under-standing, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

What is claimed is:

1. A method for training an artificial intelligence (AI) model for play of a video game, comprising:
　　receiving game state data of the video game as input state data for the AI model;
　　using the AI model to generate a control input for a virtual player of the video game based on the input state data;
　　generating a video stream of play of the video game by executing game logic of the video game in accordance with both the control input for the virtual player of the video game as generated by the AI model and the game state data of the video game;
　　transmitting the video stream of play of the video game to a client device of a human player of the video game;
　　receiving sensor data representing a time-varying response of the human player to the video stream;
　　determining, using the sensor data, whether the response of the human player to the video stream indicates approval or disapproval by the human player at each of multiple different times during the video stream;
　　generating, using a result of the determination, training feedback data including a time-dependent series of feedback elements correlated to the video stream of play of the video game, wherein each feedback element indicates that the control input for the virtual player of the video game as generated by the AI model is either a player-approved control input for the virtual player or a player-disapproved control input for the virtual player;
　　training the AI model by reinforcing use of the player-approved control input for the virtual player in response to the input state data; and
　　training the AI model by diminishing use of the player-disapproved control input for the virtual player in response to the input state data.

2. The method as recited in claim 1, wherein the game state data of the video game defines a state of game play of the video game by a particular player at a particular point in time.

3. The method as recited in claim 1, wherein the control input for the virtual player of the video game is one or more of a number of control inputs available for use by the human player of the video game in response to a state of play of the video game corresponding to the input state data.

4. The method as recited in claim 1, wherein the control input for the virtual player of the video game is one or more control input signals generatable by a game controller device.

5. The method as recited in claim 1, wherein the sensor data includes an indication of at least one interaction by the human player with a game controller device.

6. The method as recited in claim 1, wherein;

the sensor data includes one or more audio signals generated by a microphone configured to capture sounds of the human player of the video game; and determining whether the response of the human player to the video stream indicates approval or disapproval by the human player comprises analyzing the one or more audio signals to identify speech of the human player.

7. The method as recited in claim 1, wherein the sensor data includes image data generated by a camera configured to capture video of the human player of the video game; and determining whether the response of the human player to the video stream indicates approval or disapproval by the human player comprises analyzing the image data to identify one or more gestures made by the human player.

8. The method as recited in claim 1, comprising correlating the time-dependent series of feedback elements to the video stream of play of the video game by associating a given feedback element with an immediately preceding control input for the virtual player of the video game as generated by the AI model.

9. The method as recited in claim 1, further comprising:

time-slicing the game state data of the video game and the time-dependent series of feedback elements into a series of time slices;

identifying a given feedback element within a given time slice;

searching the game state data over a set of time slices in reverse temporal order for an immediately preceding control input for the virtual player of the video game as generated by the AI model relative to the given feedback element, wherein the set of time slices includes the given time slice;

identifying the immediately preceding control input for the virtual player of the video game as generated by the AI model; and associating the given feedback element with the immediately preceding control input for the virtual player of the video game as generated by the AI model.

10. The method as recited in claim 1, wherein use of the player-approved control input for the virtual player by the AI model in response to the input state data is reinforced by increasing a weight of an interconnection between neural nodes within a neural network of the AI model, and wherein use of the player-disapproved control input for the virtual player by the AI model in response to the input state data is diminished by decreasing the weight of the interconnection between neural nodes within the neural network of the AI model.

11. A computer system, comprising:

a processor; and a memory coupled to the processor and having stored therein program instructions that when executed by the computer system cause the computer system to execute a method for training an artificial intelligence (AI) model for play of a video game, comprising:

receiving a game state data of the video game as input state data for the AI model;

using the AI model to generate a control input for a virtual player of the video game based on the input state data;

generating a video stream of play of the video game by executing game logic of the video game in accordance with both the control input for the virtual player of the video game as generated by the AI model and the game state data of the video game;

transmitting the video stream of play of the video game to a client device of a human player of the video game;

receiving sensor data representing a time-varying response of the human player to the video stream;

determining, using the sensor data, whether the response of the human player to the video stream indicates approval or disapproval by the human player at each of multiple different times during the video stream generating, using a result of the determination, training feedback data including a time-dependent series of feedback elements correlated to the video stream of play of the video game, wherein each feedback element indicates that the control input for the virtual player of the video game as generated by the AI model is either a player-approved control input for the virtual player or a player-disapproved control input for the virtual player;

training the AI model by reinforcing use of the player-approved control input for the virtual player in response to the input state data; and training the AI model by diminishing use of the player-disapproved control input for the virtual player in response to the input state data.

12. The computer system as recited in claim 11, wherein the game state data of the video game defines a state of game play of the video game by a particular player at a particular point in time.

13. The computer system as recited in claim 11, wherein the control input for the virtual player of the video game is one or more of a number of control inputs available for use by the human player of the video game in response to a state of play of the video game corresponding to the input state data.

14. The computer system as recited in claim 11, wherein the control input for the virtual player of the video game is one or more control input signals generatable by a game controller device.

15. The computer system as recited in claim 11, wherein the sensor data includes an indication of at least one interaction by the human player with a game controller device.

16. The computer system as recited in claim 11, wherein the sensor data includes one or more audio signals generated by a microphone configured to capture sounds of the human player of the video game; and determining whether the response of the human player to the video stream indicates approval or disapproval by the human player comprises analyzing the one or more audio signals to identify speech of the human player.

17. The computer system as recited in claim 11, wherein the sensor data includes image data generated by a camera configured to capture video of the human player of the video game; and determining whether the response of the human player to the video stream indicates approval or disapproval by the human player comprises analyzing the image data to identify one or more gestures made by the human player.

18. The computer system as recited in claim 11, wherein the memory includes program instructions for associating a given feedback element with an immediately preceding control input for the virtual player of the video game as generated by the AI model in order to correlate the time-dependent series of feedback elements to the video stream of play of the video game.

19. The computer system as recited in claim 11, wherein the memory includes program instructions for:

time-slicing the game state data of the video game and the time-dependent series of feedback elements into a series of time slices, identifying a given feedback element within a given time slice, searching the game state data over a set of time slices in reverse temporal order for an immediately preceding control input for the virtual player of the video game as generated by the AI model relative to the given feedback element, wherein the set of time slices includes the given time slice, identifying the immediately preceding control input for the virtual player of the video game as generated by the AI model, and associating the given feedback element with the immediately preceding control input for the virtual player of the video game as generated by the AI model.

20. The computer system as recited in claim 11, wherein the memory includes program instructions for reinforcing use of the player-approved control input for the virtual player by the AI model in response to the input state data by increasing a weight of an interconnection between neural nodes within a neural network of the AI model, and wherein memory includes program instructions for diminishing use of the player-disapproved control input for the virtual player by the AI model in response to the input state data by decreasing the weight of the interconnection between neural nodes within the neural network of the AI model.

* * * * *